United States Patent [19]

Tomitaka

[11] Patent Number: 5,084,754
[45] Date of Patent: Jan. 28, 1992

[54] METHOD AND APPARATUS FOR EFFECTING FUZZY CONTROL OF AN IMAGING DEVICE

[75] Inventor: Tadafusa Tomitaka, Tokyo, Japan

[73] Assignee: Sony Corporation, Tokyo, Japan

[21] Appl. No.: 584,085

[22] Filed: Sep. 18, 1990

[30] Foreign Application Priority Data

| Sep. 20, 1989 | [JP] | Japan | 1-244469 |
| Sep. 21, 1989 | [JP] | Japan | 1-247815 |
| Sep. 21, 1989 | [JP] | Japan | 1-247816 |
| Sep. 30, 1989 | [JP] | Japan | 1-255476 |

[51] Int. Cl.$^5$ .................... H04N 5/232; H04N 5/238
[52] U.S. Cl. .................... 358/209; 358/227; 358/228
[58] Field of Search .......... 358/209, 213.19, 225, 358/227, 228; 354/446, 451, 452, 455; 352/141; 364/807

[56] References Cited

U.S. PATENT DOCUMENTS

| 4,860,243 | 8/1989  | Ueno     | 364/807 |
| 4,864,490 | 9/1989  | Nomoto   | 364/157 |
| 4,924,317 | 5/1990  | Hirao    | 358/227 |
| 4,959,728 | 9/1990  | Takahashi| 358/228 |
| 4,961,225 | 10/1990 | Hisano   | 364/807 |
| 4,998,129 | 3/1991  | Watanabe | 354/452 |
| 4,998,162 | 3/1991  | Kondo    | 358/227 |

Primary Examiner—Howard W. Britton
Assistant Examiner—Sherrie Hsia
Attorney, Agent, or Firm—Alvin Sinderbrand; William S. Frommer

[57] ABSTRACT

The optical characteristics of an imaging device of the type having an adjustable imaging member are controlled by detecting the operating optical condition of that device, generating correction control data as a function of the detected condition by using fuzzy inference to obtain correction control values, and adjusting the imaging member in response to the correction control data.

62 Claims, 9 Drawing Sheets

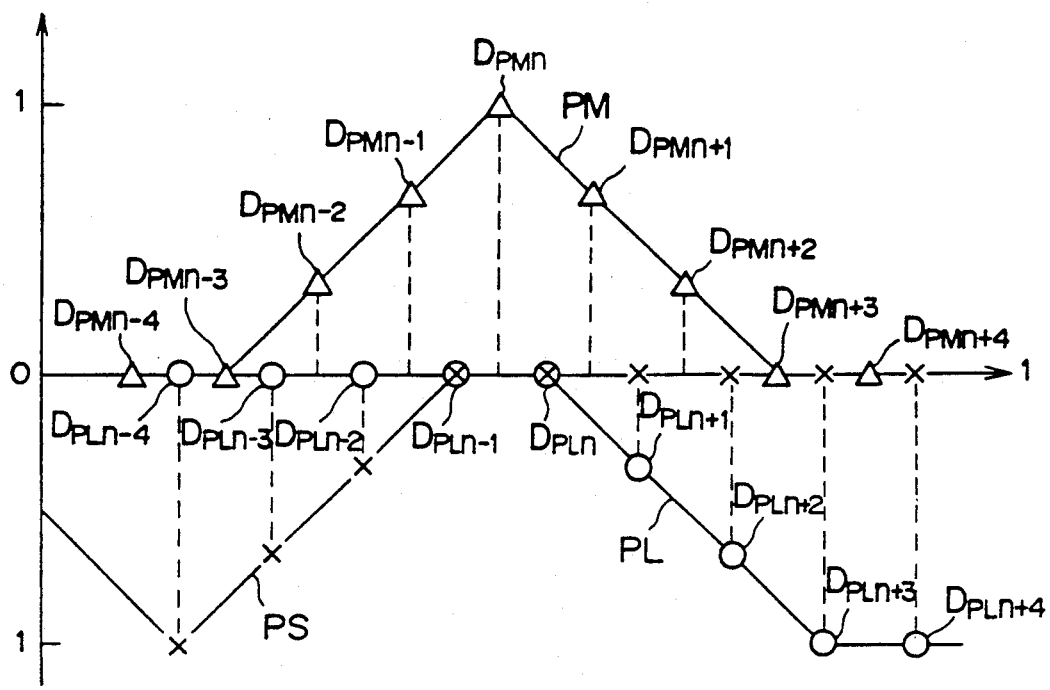
FIG. 5
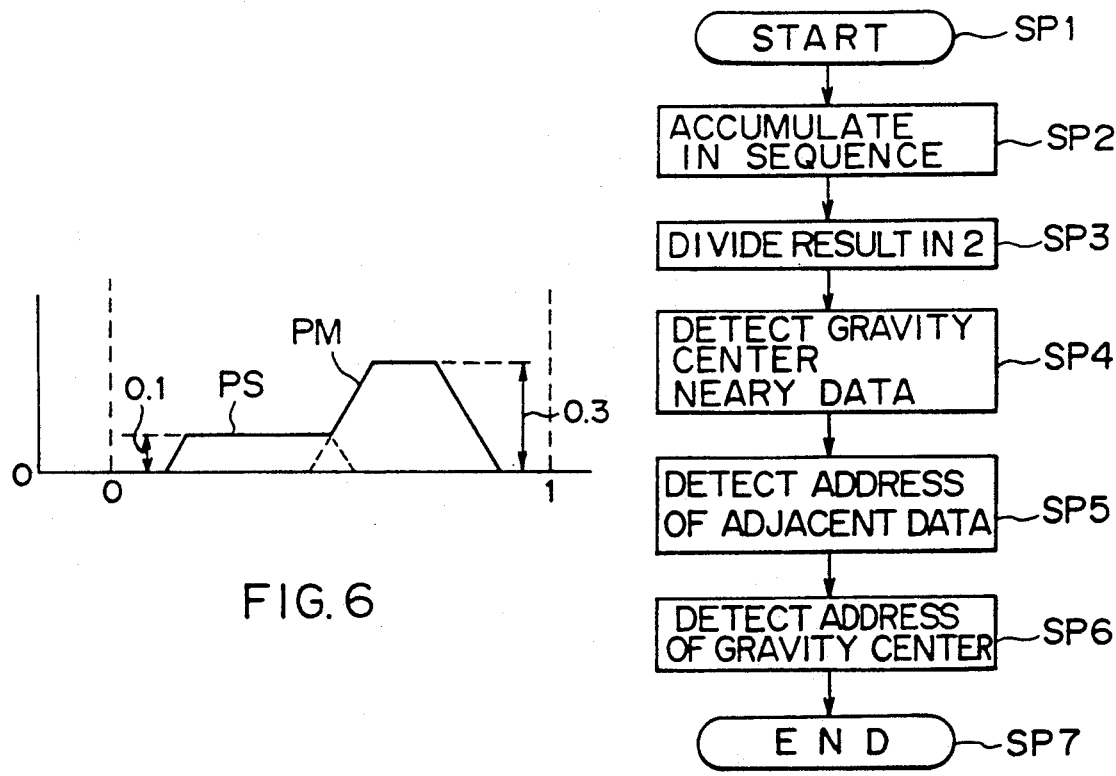
FIG. 6
FIG. 7

|  | LENS POSITION DATA $F_0$ | FOCUS CHANGE $\Delta b_0$ | LENS DRIVE DATA $e_0$ | FOCUS DATA $b_0$ |
|---|---|---|---|---|
| PM | 21 | --- | --- | --- |
| PS | 17 | --- | --- | --- |
| ZR | 13 | --- | --- |  |
| NS | 9 | --- | --- |  |
| NM | 5 | --- | --- |  |

$D_{SUB}$

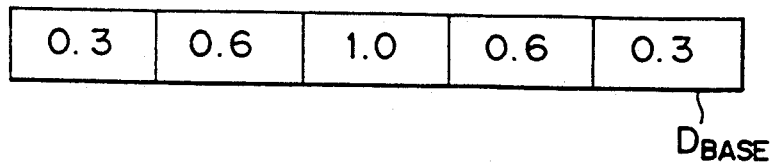
FIG.20
| | SUBSCREEN ROWS | SUBSCREEN COLUMNS | BRIGHTNESS | CONTROL DATA $D_{CONT1}$ | CONTROL DATA $D_{CONT2}$ |
|---|---|---|---|---|---|
| RM, UM PM, L | 21 | --- | --- | --- | --- |
| RS, US PS, LL | 17 | --- | --- | --- | --- |
| ULC, LRC ZR, N | 13 | --- | --- | --- | --- |
| LS, NS, LD | 9 | --- | --- | --- | --- |
| LM NM, D | 5 | --- | --- | --- | --- |
$D_{SUB}$
FIG.21
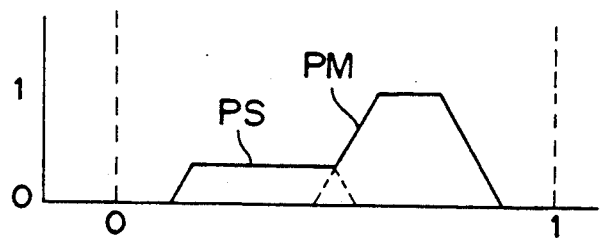
FIG.22

METHOD AND APPARATUS FOR EFFECTING FUZZY CONTROL OF AN IMAGING DEVICE

BACKGROUND OF THE INVENTION

1. Field of the Invention

This invention relates to an optical control arrangement having particular application in television or still video cameras and, more particularly, to the use of fuzzy inference, or fuzzy reasoning, to achieve highly accurate control.

2. Description of the Prior Art

Aperture control has been used in television cameras whereby a controllable diaphragm is adjusted automatically and/or in response to manual selection to regulate the amount of light passing therethrough and, thus, to regulate the brightness of an image focused onto a pickup element. Illustrative diaphragm adjustment techniques are described in Japanese Patent Applications Nos. 63-208825, 63-213098 and 63-215858. A typical prior art diaphragm control arrangement is illustrated in FIG. 1 herein.

As shown in FIG. 1, a diaphragm of blade-like construction is driven by an iris motor 2 in response to control signals produced by a diaphragm control circuit. The actual position or aperture of the diaphragm is detected by a Hall element 3; and the position indication produced by that element is compared to a desired position indication to determine whether the aperture should be increased or decreased. The desired position of the diaphragm, that is, the desired aperture opening, may be manually selected and a reference voltage $V_{REF}$ generated by a reference voltage generator 7 represents the desired diaphragm position. Typically, $V_{REF}$ is produced by an adjustable resistor or other variable voltage generator to represent the aperture opening desired by, for example, a television cameraman.

A voltage $V_K$ produced by Hall element 3 and representing the actual position of the diaphragm, is compared to the reference voltage $V_{REF}$ by resistors 4 and 5. The difference between these voltages, that is, the difference between the actual and desired positions of the diaphragm, is coupled to the inverting input of an integrating operational amplifier 10 via a resistor 6. The integrating operational amplifier is provided with a parallel RC circuit formed of resistor 11 and capacitor 12 connected in feedback relationship between the output terminal and the inverting input thereof. The integrated signal produced by amplifier 10 is supplied as a drive signal to a driving coil 13 of iris motor 2.

Operational amplifier 0 also includes a non-inverting input to which is supplied a standard voltage generated by a reference source 16 (schematically illustrated as a battery) and supplied through a resistor 14. A damping coil 18 included in iris motor 2 is coupled across the inverting and non-inverting inputs of this operational amplifier.

The drive signal supplied to driving coil 13 by operational amplifier 10 also is supplied by a resistor 21 to the inverting input of an integrating operational amplifier 20. Similar to operational amplifier 10, amplifier 20 is provided with a parallel RC circuit formed of resistor 24 and capacitor 22 connected in feedback relationship between the output terminal of operational amplifier 20 and the inverting input thereof. Amplifier 20 includes a non-inverting input supplied via a resistor 26 with the standard voltage produced by reference source 16.

Driving coil 13 of iris motor 2 is connected across the output terminals of integrating operational amplifiers 10 and 20, as shown. Accordingly, the iris motor is driven in a direction such that the actual position of the diaphragm, as represented by output voltage $V_K$ produced by Hall element 3, coincides with the desired position represented by the reference voltage $V_{REF}$ generated by reference voltage generator 7.

The prior art arrangement shown in FIG. 1 is subject to errors when the operating characteristics of, for example, the iris motor, differs from one television camera to another. Likewise, changes in temperature affect the operation of the illustrated arrangement in a manner which may not be fully predictable. Still further, since the mechanical tolerances between the iris motor, the Hall element and the diaphragm controlled by the motor may vary from one camera to another, it is difficult to realize an accurate computer model of the diaphragm control assembly.

Another disadvantage associated with the prior art arrangement shown in FIG. 1 resides in the non-linear relationship between the diaphragm aperture and the amount of light, or brightness of the image projected therethrough, to an optical pickup. Although the diaphragm is adjusted in a generally linear manner by the illustrated arrangement, the optoelectric conversion characteristic of a typical pickup element used to generate a video signal in response to the image projected thereon is non-linear. Furthermore, the brightness of the optical image is logarithmically related to the level of the video pickup signal. That is, changes in the pickup signal level vary logarithmically with changes in the image brightness. Consequently, diaphragm adjustments may not be made quickly, smoothly and precisely when a user selects a new aperture opening.

In addition to effecting electronic aperture control in response to a manual adjustment, prior art television cameras (as well as still video cameras) include arrangements adapted to provide automatic focusing in response to a high frequency component of a video pickup signal. Such automatic focusing is described in Japanese Patent Application No. 63-215850.

When a television camera is properly focused, the boundary between a focused object and, for example, its background, is relatively sharp. Such a sharply defined boundary results in a high frequency component of the pickup signal produced by a pickup element onto which the focused object is imaged. The sharpness of this boundary is reduced when the object is out of focus. Thus, an indication of the focus condition of the television camera is provided by the high frequency component of the image pickup signal. Typically, the high frequency component is converted to a digital signal and processed in accordance with one or more predetermined algorithms to generate a control signal for automatically adjusting the focus condition of the camera.

The algorithms used to generate the focus control signal should take into account the possibility of a change in the high frequency component of the image pickup signal due to factors other than an out-of-focus condition, such as a signal level change due to movement of the subject, jiggling of the camera, and the like. Additionally, the algorithms should take into account the desirability of providing a very small change in the focus condition for the purpose of determining the direction in which focus correction must be made. Still further, additional algorithms are needed to prevent a change in the focus condition in the event that an object other than the desired subject moves through the imaging field, and particularly moves adjacent to or in front of the desired subject.

Thus, the control circuitry needed for automatic focusing is expected to be relatively complicated, thus adding to the overall complexity of the television camera. Also, even though many algorithms may be provided, such as mentioned above, supplemental algorithms generally are necessary to provide automatic focusing for a subject located in different environments. Hence, it is quite difficult, if not impossible, to provide a computer model for each anticipated environment. As a result, precise automatic focusing by use of such prior art techniques is not easily attainable.

Other television or still video camera optical controlling arrangements are used to adjust the aperture opening of the camera diaphragm in response to the brightness level of the signal produced by the pickup element included therein. This automatic diaphragm adjustment arrangement operates in conjunction with automatic gain control of the image pickup signal. Consequently, imaging in low light conditions can be achieved by providing a large aperture opening together with high signal gain.

For example, if the image pickup element is provided with a pickup screen M having a central portion MM, such as shown in FIG. 2, the brightness level of the image pickup signal produced by the central portion MM typically is assigned high priority (sometimes referred to as center-weighted priority). Aperture control as well as signal gain control are effected by detecting the signal levels derived from the higher priority central portion MM and from the lower priority peripheral portion of the pickup screen. For example, let it be assumed that the signal level averaged over central portion MM is represented as $K_{MM}$ and the signal level averaged over the peripheral portion of pickup screen M is represented as $K_{MS}$. The weighted average of the overall signal derived from pickup screen M then may be expressed as $K = 2K_{MM} + K_{MS}$. The aperture opening of the diaphragm is controlled such that K is made equal to a predetermined value. The influence over the aperture opening due to the central portion MM is seen to be greater than that due to the peripheral portion of the pickup screen.

In this type of automatic diaphragm control, automatic gain control over the image pickup signal also is provided so that, for example, when the image pickup signal level is low even though the diaphragm is fully opened, the signal gain is increased. Conversely, if the image pickup signal level is quite high even though the diaphragm opening is small, the signal gain is reduced. It is appreciated that there is a cooperative relationship between the level of the image pickup signal, the gain applied to that signal and the aperture opening of the diaphragm.

However, certain disadvantages are associated with the automatic aperture control arrangement of the aforementioned type. For example, if the pickup signal gain is changed and thereafter the intensity of the object imaged onto the pickup screen changes, a false or inadequate diaphragm adjustment may result. Also, movement of a bright object from central portion MM to the peripheral portion of pickup screen M will result in a sharp change in the weighted average of the overall brightness imaged onto the pickup screen that may cause an insufficient or incorrect diaphragm adjustment. Still further, when the television camera incorporating the automatic diaphragm adjustment arrangement is used in different environments, such as on snow, at the seashore, and the like, substantial brightness levels in the background may cause such a small aperture opening and small signal gain as to render the level of the pickup signal inadequate.

OBJECTS AND SUMMARY OF THE INVENTION

Therefore, it is an object of the present invention to provide an improved technique which overcomes the drawbacks and disadvantages associated with the aforementioned optical control of an imaging device.

Another object of this invention is to provide an improved technique for achieving accurate diaphragm control in accordance with a desired setting therefor.

A further object of this invention is to provide an improved technique for automatic focusing of an imaging device, such as a television or still video camera.

An additional object of this invention is to provide an improved technique for providing automatic diaphragm and gain control to produce proper brightness levels of an image pickup signal.

Still another object of this invention is to utilize fuzzy inference, or fuzzy reasoning, for controlling the optical characteristics of an imaging device.

Yet a further object of this invention is to provide an improved technique for representing membership functions for use with fuzzy reasoning.

Various other objects, advantages and features of the present invention will become readily apparent from the ensuing detailed description, and the novel features will be particularly pointed out in the appended claims.

In accordance with this invention, the optical characteristics of an imaging device having an adjustable imaging member are controlled by detecting the operating optical condition of that imaging device, generating correction control data as a function of the detected condition by using fuzzy inference to obtain correction control values, and adjusting the imaging member in response to the correction control data.

Preferably, the adjustable imaging member is positionable, and the operating optical condition is detected by producing positioning data representing the positioning of the adjustable imaging member and by producing optic data representing an operating function of the adjustable imaging member.

In one embodiment, the adjustable imaging member comprises a diaphragm having an adjustable aperture, the positioning data represents aperture position $\theta$ and the optic data represents a change $\Delta\theta$ in the aperture position.

In another embodiment, the adjustable imaging member comprises one or more movable lens elements, the positioning data represents positioning $(e_o(n-1))$ of the lens, such as a preceding lens driving signal, and the optic data represents focusing $(\Delta b_o)$, such as a change in the focusing condition, of the lens.

In accordance with a further embodiment of this invention, the adjustable imaging member comprises a diaphragm for imaging an object onto a pickup screen, the position data represents aperture position of the diaphragm and the optic data represents brightness of predetermined areas of the pickup screen.

As an aspect of this invention, fuzzy inference is used to generate correction control data by providing a first set of membership functions representing respective degrees to which the positioning data satisfies predetermined ranges of data, providing a second set of membership functions representing respective degrees to which the optic data satisfies predetermined ranges of data, determining particular membership functions in the first and second sets corresponding to the positioning and operating function, respectively, of the adjustable imaging member, and using specific reasoning rules to infer a correction control value from the particular membership functions determined from the first and second sets. Advantageously, the correction control value is inferred by providing a third set of membership functions representing respective degrees to which correction control values satisfy predetermined ranges of values, selecting from the third set at least one membership function in response to the particular membership functions that have been determined from the first and second sets and in accordance with the specific reasoning rules, and deriving the correction control value from the membership function selected from the third set.

As another aspect of this invention, at least one membership function is selected from the aforementioned third set by detecting a value in each membership function of the first set that is satisfied by the positioning of the adjustable imaging member, detecting a value in each membership function of the second set that is satisfied by the operating function of the adjustable imaging member, and inferring by the specific reasoning rules those membership functions in the third set that are established by the membership functions in the first and second sets which have values that are satisfied by the positioning and operating function, respectively.

As a further aspect of this invention, the correction control value is derived by limiting the maximum value of a respective membership function selected from the third set with the lesser of the values of the membership functions satisfied by the positioning and operating function of the adjustable imaging member (these latter membership functions being used by the specific reasoning rules to infer the membership function selected from the third set). In addition, all of the limited membership functions which are selected from the third set are combined, as by an OR operation, and the substantial center of gravity of the combined, limited membership functions is determined and used to generate the correction control data.

BRIEF DESCRIPTION OF THE DRAWINGS

The following detailed description, given by way of example and not intended to limit the invention solely to the embodiments described herein, will best be understood in conjunction with the accompanying drawings in which:

FIG. 5 is a graphical illustration of a preferred representation of the membership functions shown in FIG. 4;

FIG. 6 is a graphical representation of the results of fuzzy inference obtained in accordance with one example of the operation of the present invention;

FIG. 7 is a flow chart representing the manner in which correction control data is produced from the fuzzy inference results shown in FIG. 6;

FIG. 20 represents identifying data used to represent a membership function shown in FIGS. 17, 18 or 19;

FIG. 21 represents position data for locating the respective membership functions illustrated in, for example, FIGS. 17, 18 or 19; and FIG. 22 is a graphical representation of the fuzzy inference obtained in accordance with an example of the operation of the embodiment shown in FIG. 15.

DETAILED DESCRIPTION OF CERTAIN PREFERRED EMBODIMENTS

Figure 3:
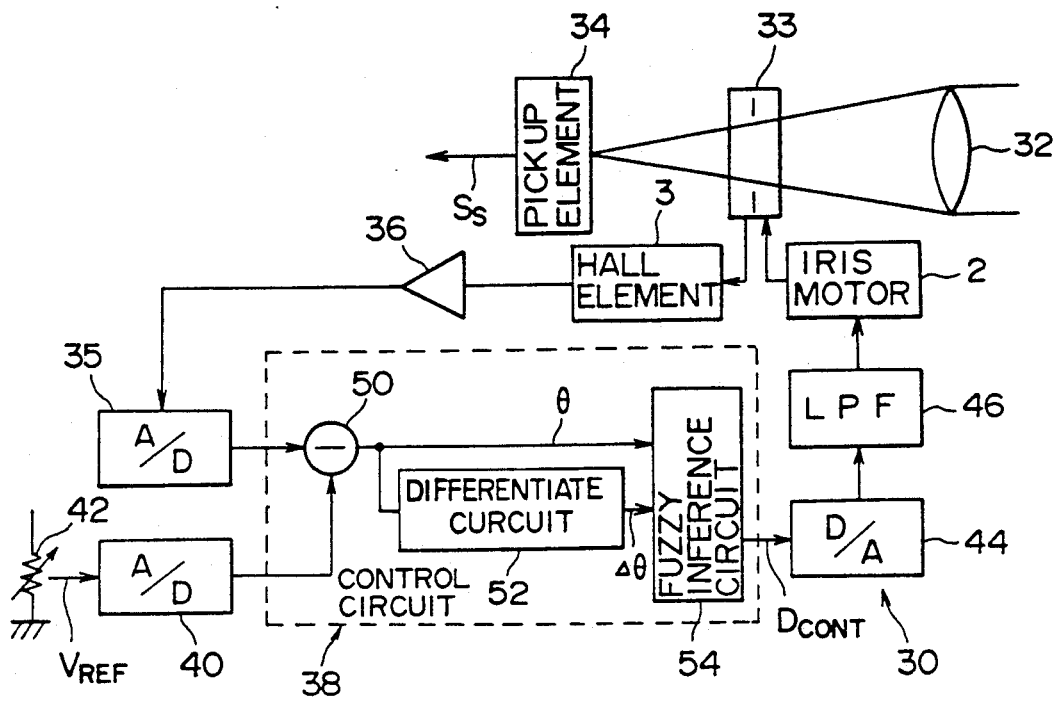
FIG. 3 is a block diagram of a diaphragm control arrangement in which the present invention finds ready application.

Turning now to FIG. 3, there is illustrated a block diagram of a television camera having a diaphragm controller in which the present invention finds ready application. Although the embodiment shown in FIG. 3 is described in the environment of a television camera, it will be appreciated that the diaphragm controller may be used in an electronic still video camera or in a conventional photographic camera having an electronically adjustable diaphragm.

Figure 1:
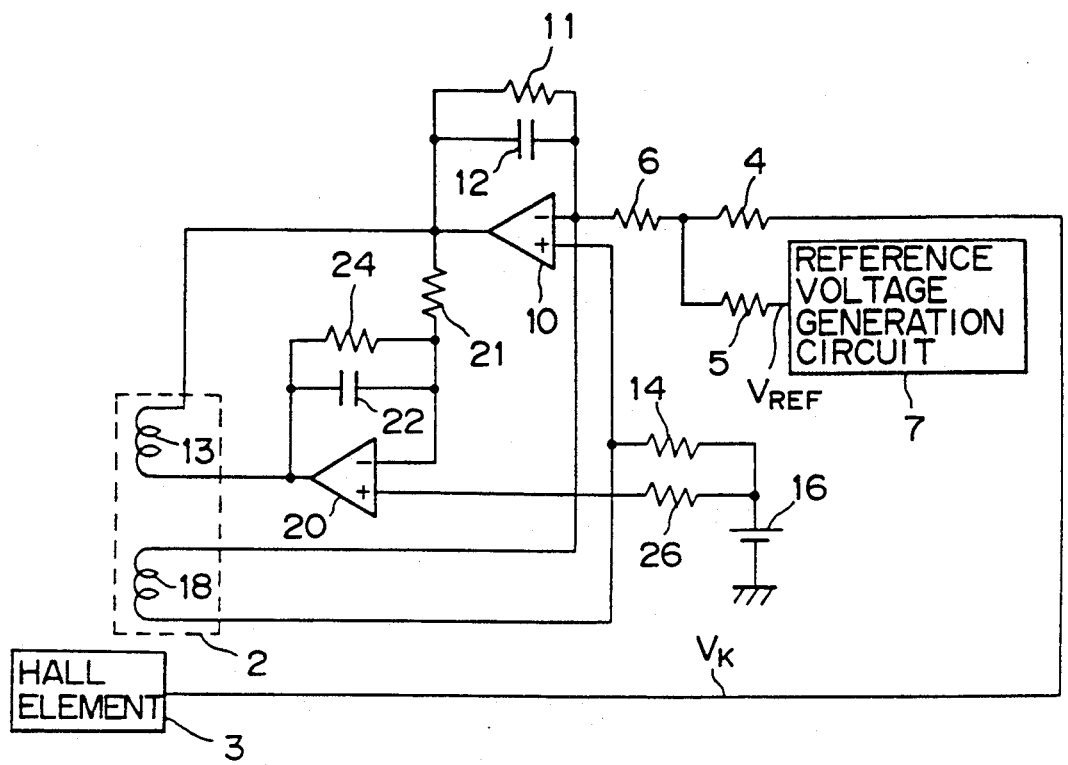
FIG. 1 is a partial block, partial schematic diagram of a prior art television camera diaphragm control arrangement.
Figure 2:
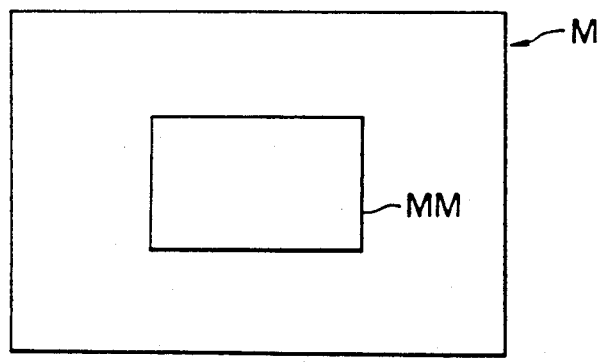
FIG. 2 is a schematic representation of a pickup screen used in a prior art television camera diaphragm controller.

A diaphragm 33 is driven by iris motor 2 (which may be similar to the iris motor described in conjunction with FIG. 1) to pass light focused by a lens 32 onto a pickup screen included in a pickup element 34. Preferably, but not necessarily, the pickup element comprises a solid-state image pickup device. Pickup element 34 and the screen included therein are conventional and are adapted to generate a pickup signal $S_s$ from which a video signal may be derived.

The position of diaphragm 33, that is, the aperture opening thereof, is sensed by a Hall element 3 (which may be similar to the Hall element described above in conjunction with FIG. 1), which produces positioning data representing the position, or aperture opening, of diaphragm 33. The positioning signal produced by the Hall element is amplified by a amplifier 36 and converted to digital form by an analog-to-digital (A/D) converter 35.

A reference voltage $V_{REF}$ is produced by a manually adjustable resistor 42; and this reference voltage is converted to digital form by an A/D converter 40. A subtractor 50 subtracts the position data produced by A/D converter 35 from the reference data produced by A/D converter 40, resulting in a deviation $\theta$ between the reference voltage $V_{REF}$ and the position signal which represents the actual position of diaphragm 33. It will be appreciated that the reference voltage $V_{REF}$ represents the desired diaphragm position as may be selected by an operator, such as a cameraman, by adjusting variable resistor 42. Thus, deviation $\theta$ represents a deviation between a preset aperture opening and the actual aperture opening of the diaphragm. This aperture deviation $\theta$ is applied to a fuzzy inference circuit 54.

As the actual aperture opening of diaphragm 33 changes, the aperture deviation $\theta$ likewise changes. The amount of this change $\Delta\theta$ in the aperture deviation (for example, from one clock time to the next) is detected by a differentiating circuit 52 which differentiates the aperture deviation $\theta$ to obtain the change $\Delta\theta$ in that deviation. The deviation change $\Delta\theta$ likewise is supplied to fuzzy inference circuit 54.

Subtractor 50, differentiating circuit 52 and fuzzy inference circuit 54 are included in a control circuit 38 which produces correction control data $D_{CONT}$ as a result of a fuzzy inference operation, to be described. This correction control data $D_{CONT}$ is converted from digital to analog form by a digital-to-analog (D/A) converter 44, the output of which is supplied to iris motor 2 as a correction control value, or signal, via a low pass filter 46. Thus, depending upon the aperture deviation $\theta$ and the deviation change $\Delta\theta$, iris motor 2 is controlled to open or close diaphragm 33 until the aperture opening thereof is substantially identical to the preset aperture opening established by the reference voltage $V_{REF}$.

As will be described, a fuzzy inference operation permits precise control over diaphragm 33 even though, as noted above, a simple computer model of the diaphragm and diaphragm control circuitry may not be easily constructed. Fuzzy inference provides accurate control by way of relatively simple and inexpensive circuit construction. Hence, the diaphragm is controlled rapidly and smoothly in response to a manual operation, or setting, of adjustable resistor 42.

Fuzzy inference circuit 54 now is described in greater detail. Preferably, this circuit includes a commercially available microprocessor (the particular manufacturer and model form no part of the present invention per se) and, additionally, it includes fuzzy logic circuits of the type described in U.S. Pat Nos. 4,694,418 and 4,837,725. The microprocessor is programmed to carry out specific reasoning rules, described below, and fuzzy logic implementations, such as described in U.S. Pat. Nos. 4,760,896 and 4,864,490.

The purpose of the fuzzy inference circuit is to generate correction control data $D_{CONT}$, from which an aperture control signal may be produced, as a function of the particular aperture deviation $\theta$ and deviation change $\Delta\theta$. If the actual aperture opening is much smaller than the desired, or reference aperture opening, the aperture deviation $\theta$ will exhibit a large positive value and diaphragm 33 should be opened rapidly. Conversely, if the actual aperture opening is much greater than the reference aperture opening, the aperture deviation $\theta$ will exhibit a large negative value and aperture 33 should be closed quickly.

If the actual aperture opening is moderately less than the reference aperture opening, resulting in a positive intermediate value for the aperture deviation $\theta$, and if the deviation change $\Delta\theta$ is practically zero, then diaphragm 33 should be opened at a moderate rate of speed. However, if the actual aperture opening is only slightly less than the reference aperture opening, resulting in a small positive value for aperture deviation $\theta$, and if the deviation change $\Delta\theta$ likewise exhibits a relatively small positive value, then diaphragm 33 should be opened at a low rate of speed.

If the actual aperture opening is only slightly less than the reference aperture opening, and if the deviation change $\Delta\theta$ exhibits a relatively small, negative value, then diaphragm 33 should not be adjusted. If, prior to this condition, the diaphragm had been in the process of being opened or closed, such operation now is stopped.

If the actual aperture opening is moderately greater than the reference aperture opening, resulting in a negative, intermediate value for aperture deviation $\theta$, and if the deviation change $\Delta\theta$ is practically zero, diaphragm 33 should be closed at a moderate rate of speed.

If the actual aperture opening is only slightly greater than the reference aperture opening, resulting in a small, negative value for aperture deviation $\theta$, and if the deviation change $\Delta\theta$ likewise exhibits a relatively small, negative value, then diaphragm 33 should be closed at a relatively low rate of speed.

If the actual aperture opening is only slightly greater than the reference aperture opening, resulting in a relatively small, negative value for aperture deviation $\theta$, and if the deviation change $\Delta\theta$ exhibits a relatively small, positive value, then diaphragm 33 should not be changed. If, prior to this condition, the diaphragm had been in the process of being opened or closed, that operation is stopped. Likewise, if the actual aperture opening is almost equal to the reference aperture opening and if the deviation change $\Delta\theta$ likewise is almost zero, then diaphragm 33 should be neither opened nor closed.

Fuzzy inference circuit 54 operates to carry out the foregoing rules of operation, which are known herein as specific reasoning rules. For convenience, the values of the aperture deviation $\theta$, the deviation change $\Delta\theta$ and the correction control data $D_{CONT}$ may be expressed as follows:

PL = Positive Large
PM = Positive Medium
PS = Positive Small
ZR = Substantially Zero
NS = Negative Small
NM = Negative Medium
NL = Negative Large The foregoing rules of operation then may be expressed by the following reasoning rules:

Rule R1:
If $\theta$ = PL then $D_{CONT}$ = PL
Rule R2:
If $\theta$ = NL then $D_{CONT}$ = NL Rule R3:
If $\theta$=PM and $\Delta\theta$=ZR then $D_{CONT}$=PM
Rule R4:
If $\theta$=PS and $\Delta\theta$=PS then $D_{CONT}$=PS
Rule R5:
If $\theta$=PS and $\Delta\theta$=NS then $D_{CONT}$=ZR
Rule R6:
If $\theta$=NM and $\Delta\theta$=ZR then $D_{CONT}$=NM
Rule R7:
If $\theta$=NS and $\Delta\theta$=NS then $D_{CONT}$=NS
Rule R8:
If $\theta$=NS and $\Delta\theta$=PS then $D_{CONT}$=ZR
Rule R9:
If $\theta$=ZR and $\Delta\theta$=ZR then $D_{CONT}$=ZR Fuzzy inference circuit 54 executes reasoning rules R1-R9 by the use of membership functions. That is, aperture deviation $\theta$, deviation change $\Delta\theta$, and correction control data $D_{CONT}$ each may be represented by a set of membership functions. Depending upon the actual value of the aperture deviation $\theta$ produced by subtractor 50 and the actual value of the deviation change $\Delta\theta$ produced by differentiating circuit 52, the inferred correction control data $D_{CONT}$ exhibits a value that may be satisfied by one or more membership functions; and a suitable diaphragm control signal is derived from those membership functions.

Figure 4:
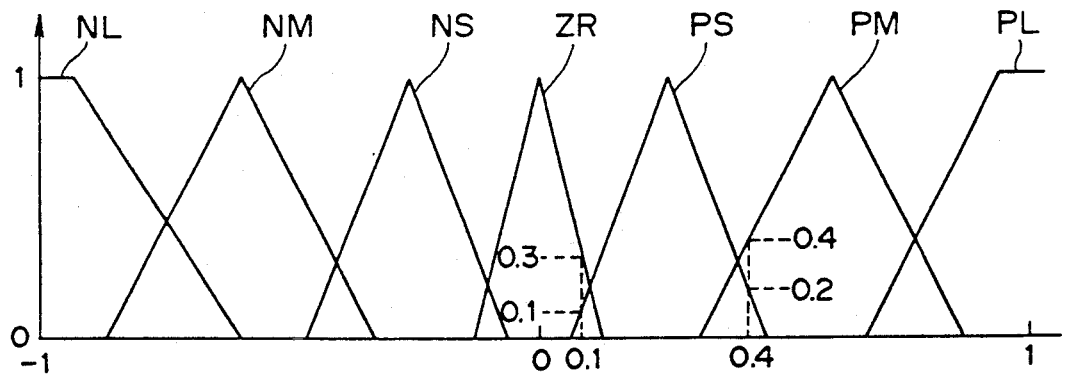
FIG. 4 is a graphical representation of membership functions used in conjunction with fuzzy inference to obtain diaphragm control in accordance with the present invention.

Before describing the manner in which inference processing using these membership functions is carried out, reference is made to FIG. 4 which graphically illustrates a set of membership functions that represent the degree to which, for example, aperture deviation 8 satisfies predetermined ranges. Seven membership functions are illustrated as NL, NM, NS, ZR, PS, PM and PL, with these terms having the meanings expressed above. The abscissa shown in FIG. 4 represents a normalized variable, such as the normalized aperture deviation $\theta$. The normalized value 0 corresponds to an actual aperture opening that is substantially equal to the reference aperture opening, the normalized value +1 corresponds to an actual aperture opening that is significantly less than the reference aperture opening and the normalized value $-1$ corresponds to an actual aperture opening that is significantly greater than the reference aperture opening.

The membership functions illustrated in FIG. 4 also represent the degree to which deviation change $\Delta\theta$ satisfies predetermined ranges of change. Hence, the normalized value 0 along the abscissa represents substantially zero deviation change $\Delta\theta$, the normalized value +1 represents a very large, positive deviation change $\Delta\theta$ and the normalized value $-1$ represents a very large, negative deviation change $\Delta\theta$.

Likewise, the membership functions of FIG. 4 represent the degree to which correction control data satisfy predetermined ranges of control. Consequently, the normalized value 0 represents substantially zero control data from which a drive signal for iris motor 2 is derived, the normalized value +1 represents large control data which tends to open the diaphragm aperture and the normalized value $-1$ represents large control data which tends to close the aperture opening.

The ordinate shown in the graphical illustration of FIG. 4 represents the degree to which the normalized variable $\theta$, $\Delta\theta$ or $D_{CONT}$ satisfies the indicated range. In the illustrated embodiment, the membership functions PM, PS, ZR, NS and NM are substantially triangular in shape. As used herein, the "value" of a membership function means the degree to which the variable satisfies a respective range. The set of membership functions corresponding to aperture deviation $\theta$, the set of membership functions corresponding to deviation change $\Delta\theta$ and the set of membership functions corresponding to correction control data $D_{CONT}$ may be stored in a memory, such as a ROM, by quantizing each membership function such that each quantized sample is stored as a digital representation of the sample value and the abscissa location (or coordinate) of that sample.

The triangularly shaped membership functions illustrated in FIG. 4 are relatively wider for those membership functions having large, positive or negative normalized values relative to the triangular shapes of those membership functions having smaller normalized values. It is seen that the widths of membership functions NM and PM are significantly greater than the width of membership function ZR. By providing the sets of membership functions with the triangular characteristics illustrated in FIG. 4, highly precise correction control data is produced by fuzzy inference even when the user operates adjustable resistor 42 to effect a small aperture change or a slowly varying aperture change. Likewise, precise and smooth aperture changes are effected even when the user selects a large or quickly varying aperture change. Hence, depending upon the speed with which adjustable resistor 42 is changed, the aperture of diaphragm 33 likewise will be changed slowly or quickly, consistent therewith.

Furthermore, by using fuzzy inference in conjunction with the membership functions illustrated in FIG. 4, highly precise correction control data may be produced even if the resolution, or quantization levels, of A/D converters 35 and 40 are relatively low. This offers the additional advantage of utilizing relatively inexpensive A/D converters.

It will be recognized that the quantity of light impinging upon pickup element 34 changes in proportion to the aperture opening of diaphragm 33. As the diaphragm is closed, precise control is desired. Such smooth, precise control can be attained by using membership functions having the triangular characteristics illustrated in FIG. 4. As mentioned above, prior art diaphragm control techniques relied upon linear control. However, the relationship between the amount of incident light on pickup element 34 and the aperture opening is not linear. By using unsymmetrical triangular characteristics of the type shown in FIG. 4, the quantity of light incident on pickup element 34 and the control over diaphragm 33 both vary in a similar non-linear manner.

The set of membership functions shown in FIG. 4 is stored in a memory by providing sampled data for each membership function, as aforesaid. Each sample is taken at one of 32 discrete sampling intervals along the abscissa shown in FIG. 4; and each sampling interval is represented by a digital, quantized value of the membership function. For example, the data representing a membership function in a set may be stored in thirty-two memory locations, with each such location storing a digital signal (such as an 8-bit signal) representing the value of the membership function at a corresponding sampling interval. Hence, a 5-bit address may be used to access the memory; and this 5-bit address is representative of the normalized value of the variable being represented by the set of membership functions. In the embodiment described herein, this variable is the aperture deviation $\theta$ or the deviation change $\Delta\theta$ or the correction control data $D_{CONT}$.

In the preferred embodiment, although each membership function is represented by thirty-two samples, it is preferable to divide the abscissa of FIG. 4 into sixty-four samples. Nevertheless, even though sixty-four sampling intervals are used, each membership function is represented by thirty-two samples. For example, membership functions NL, NS, PS and PL may be represented by the thirty-two even samples 2, 4, 6, 8, . . . 42, 44, 46, 48, . . . 60, 62, 64; and membership functions NM, ZR and PM may be represented by the thirty-two odd samples 1, 3, 5, 7, . . . 43, 45, 47, 49, . . . 59, 61, 63. In this example, the quantized data representing membership functions NM, ZR and PM may be thought of as being shifted by ½ of a sampling pitch (assuming the abscissa is divided into thirty-two sampling intervals) from the quantized data representing membership functions NL, NS, PS and PL.

FIG. 5 graphically illustrates a portion of membership functions PS, PM and PL included in the set of membership functions which represent, for example, the degree to which aperture deviation $\theta$ satisfies predetermined ranges of deviation. For convenience, membership functions PS and PL are illustrated in inverted form simply to avoid confusion in the drawing. Sampling intervals illustrated by circles constitute the even sampling intervals and sampling intervals illustrated by triangles constitute the odd sampling intervals. It is appreciated from FIG. 5 that, even though sixty-four sampling intervals may be used, each membership function is represented by only thirty-two samples. Of these, seven samples (such as samples $D_{PMN-3}, D_{PMN-2}, \ldots D_{PMN}, \ldots D_{PMN+2}, D_{PMN+3}$) are provided with useful data. The remaining twenty-five samples effectively exhibit a magnitude of 0. It is appreciated that a memory of relatively small capacity may be utilized effectively to store the quantized data which represents a respective set of membership functions.

Fuzzy inference circuit 54 is adapted to infer correction control by using the "Mamdani" technique. (Examples of this are described in, inter alia, "Process Control Using Fuzzy Logic," Mamdani et al., Fuzzy Sets Theory and Applications to Policy Analysis and Information Systems, New York: Plenum, 1989, pages 249-265 and "An Experiment in Linguistic Synthesis with a Fuzzy Logic Controller," Mamdani et al., International Journal Man-Machine Studies, Vol. 7, pages 1-13, 1973.) Accordingly, the fuzzy inference circuit normalizes the aperture deviation $\theta$ produced by subtracting circuit 50 and also normalizes the deviation change $\Delta\theta$ produced by differentiating circuit 52. These normalized variables $\theta$ and $\Delta\theta$ are used to read from the memory those membership functions included in sets $\theta$ and $\Delta\theta$, respectively, which are satisfied by these normalized variables. Then, the selected membership functions which are read from the memory are further processed in accordance with specific reasoning rules R1-R9 to infer correction control data $D_{CONT}$. The manner in which membership functions are selected from the memory and then processed will best be appreciated by a numerical example.

Let it be assumed that the aperture deviation $\theta$ produced by subtracting circuit 50 is such that, when normalized, it exhibits a value of 0.4. With reference to FIG. 4, this normalized variable has the value 0.4 in membership function PM. This normalized variable also has the value 0.2 in membership function PS and the value 0 in all other membership functions. Let it be further assumed that the deviation change $\Delta\theta$ produced by differentiating circuit 52 is such that, when normalized, it exhibits a value of 0.1. From FIG. 4, this normalized variable has the value 0.3 in membership function ZR and the value 0.1 in membership function PS. The value of this normalized variable in all other membership functions is 0.

Now, in accordance with reasoning rule R3, since the normalized value of $\theta$ satisfies membership function PM and since the normalized value of $\Delta\theta$ satisfies membership function ZR, it is inferred that correction control data $D_{CONT}$ is within membership function PM. Fuzzy inference circuit 54 reads from the memory the membership function data which represents membership function PM for correction control data $D_{CONT}$ to provide a suitable representation of this membership function PM.

In accordance with the Mamdani method, the membership function characteristic PM for correction control data $D_{CONT}$ is limited in its maximum value to the lesser of the membership function values corresponding to normalized $\theta$ and normalized $\Delta\theta$. In the present example, the value of the membership function ZR for $\Delta\theta$ is equal to 0.3 and is less than the value 0.4 of membership function PM for normalized $\theta$. Consequently, the maximum value of the membership function PM for $D_{CONT}$ is limited to 0.3. Hence, and as shown in FIG. 6, membership function PM for the correction control data $D_{CONT}$ is truncated, or limited, to a maximum value of 0.3. This limited membership function thus appears trapezoidal in shape.

A similar operation is carried out when applying each of the remaining reasoning rules R1, R2, R4, etc. That is, the membership function for the correction control data $D_{CONT}$ is inferred from the membership functions for the aperture deviation $\theta$ and the deviation change $\Delta\theta$, and the maximum value of the inferred membership function for the correction control data $D_{CONT}$ is limited to the smaller of the value of the membership function corresponding to the normalized variable $\theta$ or $\Delta\theta$.

Continuing with the present example, from FIG. 4, it is seen that the normalized value 0.4 for $\theta$ has the membership function value 0.2 for membership function PS. Also from FIG. 4, it is seen that the normalized value 0.1 for $\Delta\theta$ has the membership function value 0.1 for membership function PS. In accordance with reasoning rule R4, the correction control data $D_{CONT}$ is inferred to be within membership function PS. Here too, the membership function PS for correction control data $D_{CONT}$ is limited, or truncated, by the smaller of the value of membership function PS corresponding to the normalized value of $\theta$ and membership function PS corresponding to the normalized value of $\Delta\theta$. In the present example, the value of membership function PS corresponding to the normalized value of $\Delta\theta$ is equal to 0.1, which is smaller than the value 0.2 of the membership function PS corresponding to the normalized value of $\theta$. This smaller value limits the magnitude of membership function PS for correction control data $D_{CONT}$.

In the present example, the normalized values of $\theta$ and $\Delta\theta$ derived from subtracting circuit 50 and from differentiating circuit 52, respectively, satisfy none of the remaining reasoning rules R1-R9. Accordingly, FIG. 6 illustrates the two truncated membership functions PS and PM which contain the correction control data $D_{CONT}$ inferred by reasoning rules R3 and R4. The illustrated membership functions which are satisfied by the correction control data $D_{CONT}$ are subjected to an OR operation, resulting in a membership function characteristic represented by the solid line in FIG. 6. As will be described below, a correction control value may be derived from the membership function characteristic shown in FIG. 6 by determining the center of gravity of that characteristic. It is appreciated that the coordinate of that center of gravity along the abscissa represents the normalized correction control value.

The manner in which a correction control signal is produced from the membership function of the correction control data inferred by the fuzzy inference technique of the present invention now will be described. It is assumed that the correction control data membership function is as illustrated in FIG. 6. Nevertheless, it should be appreciated that other membership function characteristics will be inferred for different aperture deviations $\theta$ and deviation changes $\Delta\theta$ when reasoning rules R1-R9 are applied thereto.

The processor included in fuzzy inference circuit 54 is programmed to carry out the routine shown by the flow chart of FIG. 7 which functions to detect the center of gravity of the membership function characteristic which has been inferred for the correction control data.

Assuming that the membership function characteristic illustrated in FIG. 6 represents the correction control data inferred by reasoning rules R1-R9, this membership function characteristic is sampled by providing, for example, thirty-two samples along the abscissa. The value of each sample represents the membership function characteristic of the correction control data $D_{CONT}$, and it is appreciated that the maximum value of the membership function characteristic at any sampling point is no greater than 1. In actuality, the maximum value of the membership function characteristic is limited in accordance with the aforedescribed Mamdani technique.

Figure 8:
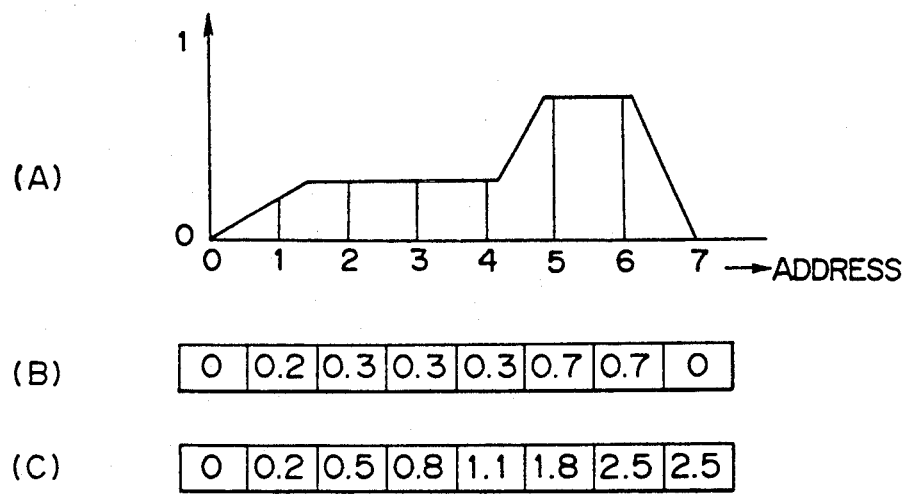
FIG. 8 is useful in understanding the manner in which the flow chart of FIG. 7 operates.

FIG. 8A illustrates eight sampling points (0-7) of the membership function characteristic shown in FIG. 6. FIG. 8B represents the value of the membership function characteristic at each sampling point and, for a purpose soon to be explained, each sampling point in FIG. 8A is associated with a corresponding address (such as address 1, 2, 3, ... 6, 7, etc.). Referring to the flow chart shown in FIG. 7, the manner in which the fuzzy inference circuit carries out the illustrated routine to determine the center of gravity of the membership function characteristic now will be discussed.

After starting the routine at instruction SP1, the fuzzy inference circuit cumulatively adds the value at each sampling point to the summation of the values obtained at the preceding sampling points, as represented by instruction SP2. FIG. 8C represents the cumulative addition from sampling point to sampling point, with each cumulative sum being stored at a corresponding address. Thus, the value of the membership function characteristic at sampling point 1 is added to the value of the membership function characteristic at sampling point 0 and is stored in address 1 corresponding to sampling point 1. Then, the value of the membership function at sampling point 2 is added to the previous accumulated sum stored at address 1, and this cumulative sum is stored in address 2 corresponding to sampling point 2. This process repeats until the cumulative sum of the values of the membership function characteristic at all of the sampling points is stored in address 7 corresponding to sampling point 7.

The fuzzy inference circuit then advances to instruction SP3 which divides the cumulative sum in address 7 by the factor 2. In the example shown in FIG. 8, the cumulative sum 2.5 is divided by 2, resulting in the quotient 1.25. Then, fuzzy inference circuit 54 advances to instruction SP4 to determine the address at which the cumulative sum closest to this quotient (1.25) is stored. From FIG. 8, it is seen that the cumulative sum of 1.1 is stored in address 4, and this is closer to the quotient 1.25 than the cumulative sum 1.8 (stored in address 5) or 0.8 (stored in address 3). Address 4 is referred to as the "gravity center near data" and represents the address closest to the center of gravity of the illustrated membership function characteristic.

Next, the control circuit advances to instruction SP5 to determine the address adjacent address 4 which stores the cumulative sum that is close to the quotient 1.25. From FIG. 8, it is seen that address 5 corresponds to this requirement and is referred to as an "adjacent data address." Then, the center of gravity is detected by interpolating the address between addresses 4 and 5 that corresponds to the address at which the quotient 1.25 would have been stored. This interpolation is obtained in accordance with the following equation:

$$(1.25 - 1.1)/(1.8 - 1.1) = 0.21$$

The resultant, interpolated value 0.21 is added to address 4 (i. e. it is added to the "gravity center near data") resulting in a sampling point, or address, at the center of gravity equal to 4.21. It is this interpolated center of gravity address that is used as the correction control signal.

It is appreciated that the center of gravity of the membership function characteristic is determined with high accuracy without requiring the use of a large number of samples to represent the membership functions. That is, high accuracy is achieved with low membership function resolution. This center of gravity then is normalized and supplied by fuzzy inference circuit 54 to D/A converter 44 for driving iris motor 2.

Locating the center of gravity of a function may be defined by the following equation:

$$W = \frac{\Sigma (\text{weight}) \times (\text{distance})}{\Sigma (\text{weight})}$$

If this equation is followed precisely, the overall arithmetic operations needed to implement this equation (assuming the use of thirty-two samples to represent a membership function characteristic) consists of thirty-two multiplication operations, sixty-four addition operations and one division operation. However, by relying upon the routine illustrated in FIG. 7, the center of gravity may be detected accurately and easily without requiring several repeated operations. That is, the routine illustrated in FIG. 7 which detects the center of gravity is far simpler than the mathetmatical routine needed to implement the foregoing equation.

To summarize the manner in which the present invention provides fuzzy correction control of diaphragm 33, the actual position, or aperture, of the diaphragm is detected by Hall element 3 and converted into a digital aperture position by A/D converter 35. The difference between the actual aperture opening and an opening desired by a user is determined by subtractor 50 which subtracts the digitized actual aperture position from a digital representation of the desired position, the latter being preset by manual operation of adjustable resistor 42 and converted to digital form by A/D converter 40.

The difference between actual and desired aperture openings produced by subtractor 50 constitutes the aperture deviation $\theta$; and this aperture deviation is supplied to fuzzy inference circuit 54.

A change $\Delta\theta$ in the aperture deviation is detected by differentiating circuit 52; and this deviation change $\Delta\theta$ also is supplied to the fuzzy inference circuit. Fuzzy inference circuit 54 utilizes reasoning rules R1-R9 to infer correction control data $D_{CONT}$ which exhibit a membership function characteristic of the type shown in FIG. 6. The center of gravity of this resulting correction control data is determined by the routine shown in FIG. 7, resulting in a correction control value that is converted to analog form by D/A converter 44 and supplied to iris motor 2. Consequently, diaphragm 33 is driven smoothly and accurately in a direction such that the actual aperture opening is made equal to the desired aperture opening.

By using even numbered samples to represent membership functions NL, NS, PS and PL and odd numbered samples to represent membership functions NM, ZR and PM, as discussed above, the correction control data $D_{CONT}$ may be precisely inferred.

Various alternatives are contemplated to the embodiment shown in FIG. 3. For example, the actual position, or aperture opening, of diaphragm 33 may be detected by means other than Hall element 3. Still further, diaphragm control may be effected by fuzzy inference circuit 54 in response to the level of the signal produced by pickup element 34 in response to the image projected thereto. Thus, signal level rather than diaphragm position may be used by the fuzzy inference circuit to generate the correction control data. Additionally, although the membership functions illustrated in FIG. 4 have been described as being quantized at sampling points which are shifted by $\frac{1}{2}$ of a sampling pitch from one membership function to the next adjacent membership function, such shifting in the sampling points may be other fractional amounts, such as $\frac{1}{3}$ of a sampling pitch. For instance, membership function NL may be sampled at sampling points a, a+3, a+6, etc.; membership function NM may be sampled at sampling points a+1, a+4, a+7, etc.; and membership function NS may be sampled at sampling points a+2, a+5, a+8, etc.

Figure 9:
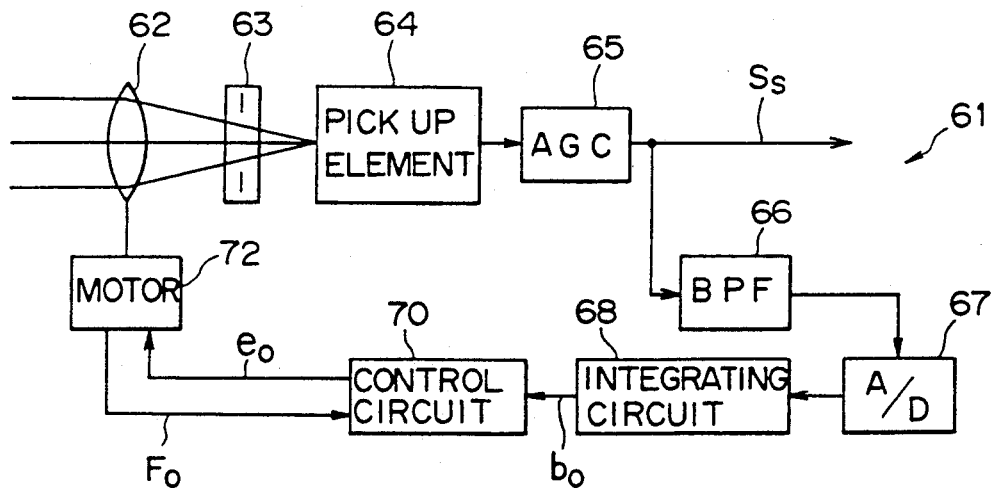
FIG. 9 is a block diagram of a television camera focusing control arrangement in which the present invention finds ready application.

Another embodiment of a television camera or still video camera having an adjustable imaging member controllable in accordance with the present invention is illustrated by the block diagram of FIG. 9. Here, the adjustable imaging member comprises a lens 62 which is positionably driven by a motor 72 to adjust the focusing condition of the lens.

In the embodiment of FIG. 9, lens 62 serves to focus an image through a diaphragm 63 onto a pickup screen included in a pickup element 64. Preferably, but not necessarily, the pickup element comprises a solid-state image pickup device. Pickup element 64 and the screen included therein are conventional and are adapted to generate a pickup signal which is amplified by an automatic gain controlled (AGC) amplifier 65 to produce pickup signal $S_s$. This gain controlled (or gain adjusted) pickup signal is supplied to further apparatus (not shown) from which a video signal may be derived.

As mentioned previously, an image sharply focused on pickup element 64 is provided with a relatively sharp boundary between the focused object and its background. In the event of an unfocused condition, the sharpness of the boundary is reduced. This boundary is represented by a high frequency component in pickup signal $S_s$. The magnitude of the high frequency component thus is reduced when lens 62 is not in a proper, focused condition. In this regard, a band pass filter 66 is coupled to AGC circuit 65 to separate the high frequency component from pickup signal $S_s$. The extracted component is digitized by an A/D converter 67; and this digitized signal is integrated by an integrating circuit 68. The integrating circuit produces an output signal $b_o$ whose magnitude represents the magnitude of the high frequency component separated from pickup signal $S_s$ by band pass filter 66. Thus, when lens 62 is an unfocused condition, the magnitude of signal $b_o$ is reduced. For convenience, this signal $b_o$ is referred to herein as a focus indicating signal, or simply a "focus signal."

Lens 62 is positionally driven by motor 72 to adjust the focusing thereof. A lens position signal $F_o$ is produced by a suitable position indicating transducer, such as a Hall element or other conventional means normally used to sense the position of a movable element. Lens position signal $F_o$ (referred to herein simply as the "position signal") also is supplied to control circuit 70.

Control circuit 70 preferably includes a microprocessor programmed to carry out a fuzzy inference operation in response to focus signal $b_o$ and position signal $F_o$ in accordance with specific reasoning rules to obtain lens driving data from which a lens drive signal $e_o$ is produced. This lens drive signal $e_o$ is applied as a motor drive signal to motor 72 which, in turn, positionally drives lens 62 in a direction to increase the magnitude of focus signal $b_o$. The motor thus is driven by the control circuit in a direction to bring the lens into focus.

Let it be assumed that the lens drive data presently supplied to motor 72 is represented as $e_o(n)$ and that the present position of the lens (which, it is appreciated, is determined by the lens drive signal that had been supplied to the motor at a preceding time interval, such as time interval $(n-1)$) is represented as $e_o(n-1)$. Let it be further assumed that the change in the focus signal $b_o$ from one time interval to the next (for example, from time interval $(n-1)$ to time interval n) is represented as $\Delta b_o$, referred to as a focus change. It will be appreciated that, when $\Delta b_o$ is positive, lens 62 is being driven toward its in-focus position. Conversely, when the focus change $\Delta b_o$ is negative, lens 62 is being driven further in the out-of-focus direction.

When the focus change $\Delta b_o$ is positive and exhibits a large value, lens 62 is being driven toward its in-focus position and the lens drive data $e_o(n)$ should be relatively large to continue driving the lens quickly toward its in-focus condition. Likewise, if the focus change $\Delta b_o$ is positive and exhibits an intermediate value, control circuit 70 produces a lens drive signal $e_o$ to drive lens 62 at a moderate rate of speed toward its in-focus position. Similarly, if the focus change $\Delta b_o$ is positive and exhibits a relatively small magnitude, the control circuit drives the lens toward its in-focus position at a relatively slow rate of speed. The foregoing has assumed that the preceding lens drive data $e_o(n-1)$ is of a relatively small, positive value.

If lens 62 is in the process of being positioned to its distant focus position, that is, to focus on objects quite distant therefrom, and the focus change $\Delta b_o$ is negative, then the polarity of the drive signal supplied from control circuit 70 to motor 72 should be reversed so as to reverse the direction in which lens 62 is driven. If the focus change $\Delta b_o$ is of a relatively large magnitude in the negative direction, then the lens drive signal $e_o(n)$ should exhibit a relatively large value in the negative direction. If the focus change $\Delta b_o$ exhibits a relatively moderate value in the negative direction, then the lens drive signal should exhibit a large value in the negative direction. But, if the focus change $\Delta b_o$ exhibits a relatively small magnitude in the negative direction, then the magnitude of the lens drive signal $e_o(n)$ should be relatively moderate, although it too is negative so as to reverse the direction in which the lens is driven at a moderate rate of speed.

Now, if lens 62 is in the process of being driven in a direction so as to focus on objects relatively close thereto, and that the lens is driven in this direction at a relatively slow rate of speed, then the lens drive signal $e_o(n)$ should exhibit a polarity to continue driving the lens in this direction if the polarity of the focus change $\Delta b_o$ is positive. For example, if the focus change $\Delta b_o$ increases substantially from one time interval to the next, then the lens drive signal should exhibit a relatively large value of negative polarity. If the focus change $\Delta b_o$ increases by a relatively moderate amount, then the lens driven signal likewise should exhibit a relatively moderate magnitude of negative polarity. And if the focus change $\Delta b_o$ increases by a relatively small amount, then the lens drive signal also should exhibit a relatively small magnitude and should be of negative polarity.

However, if, while lens 62 is being driven relatively slowly toward its close-up focus position the focus change $\Delta b_o$ is a relatively large negative amount, then the lens drive signal $e_o(n)$ should exhibit a relatively large magnitude and positive polarity. If the focus change $\Delta b_o$ is a relatively moderate negative amount, the lens drive signal should exhibit a relatively large magnitude of positive polarity. And if the focus change $\Delta b_o$ is a relatively small negative amount, the lens drive signal should exhibit a relatively moderate magnitude of positive polarity. Thus, the direction in which the lens is driven is reversed.

If, while driving lens 62 at a relatively slow rate in the direction to focus upon objects relatively distant therefrom or, conversely, in the direction to focus on objects relatively close thereto, the focus change $\Delta b_o$ is practically zero, it is concluded that lens 62 has reached its in-focus condition and the magnitude of the lens drive signal $e_o(n)$ is made substantially equal to zero.

Finally, if the magnitude of the focus signal $b_o$ is practically zero, and if lens 62 is positioned either at its most distant focused position or at its close-up focused position, the lens drive signal is made relatively large and is of a polarity to drive the lens away from that position.

The foregoing conditions are referred to as specific reasoning rules and may be summarized if the following expressions are used:
PL = Positive Large
PM = Positive Medium
PS = Positive Small
ZR = Substantially Zero
NS = Negative Small
NM = Negative Medium
NL = Negative Large It is further assumed that when lens 62 is being driven toward its distant focused position, the lens drive signal is positive. Conversely, when the lens is driven toward its close-up focused position, the lens drive signal is negative. It will be appreciated that the expression $e_o(n-1)$ represents the lens drive signal supplied to motor 72 at the preceding time interval $(n-1)$ and, thus, is representative of lens positioning. With the foregoing assumptions, the reasoning rules for controlling the focusing condition of lens 62 may be expressed as follows:

Rule H1:
If $e_o(n-1) = PS$ and $\Delta b_o = PL$ then $e_o(n) = PL$
Rule H2:
If $e_o(n-1) = PS$ and $\Delta b_o = PM$ then $e_o(n) = PM$
Rule H3:
If $e_o(n-1) = PS$ and $\Delta b_o = PS$ then $e_o(n) = PS$
Rule H4:
If $e_o(n-1) = PS$ and $\Delta b_o = NL$ then $e_o(n) = NL$
Rule H5:
If $e_o(n-1) = PS$ and $\Delta b_o = NM$ then $e_o(n) = NL$
Rule H6:
If $e_o(n-1) = PS$ and $\Delta b_o = NS$ then $e_o(n) = NM$
Rule H7:
If $e_o(n-1) = NS$ and $\Delta b_o = PL$ then $e_o(n) = NL$
Rule H8:
If $e_o(n-1) = NS$ and $\Delta b_o = PM$ then $e_o(n) = NM$
Rule H9:
If $e_o(n-1) = NS$ and $\Delta b_o = PS$ then $e_o(n) = NS$
Rule H10:
If $e_o(n-1) = NS$ and $\Delta b_o = NL$ then $e_o(n) = PL$
Rule H11:
If $e_o(n-1) = NS$ and $\Delta b_o = NM$ then $e_o(n) = PL$
Rule H12:
If $e_o(n-1) = NS$ and $\Delta b_o = NS$ then $e_o(n) = PM$
Rule I1:
If $e_o(n-1) = PS$ and $\Delta b_o = ZR$ then $e_o(n) = ZR$
Rule I2:
If $e_o(n-1) = NS$ and $\Delta b_o = ZR$ then $e_o(n) = ZR$
Rule J1:
If $b_o = ZR$ and $F_o = NL$ then $e_o(n) = PL$
Rule J2:
If $b_o = ZR$ and $F_o = PL$ then $e_o(n) = NL$ Rules H1-H12 have assumed that lens 62 is being driven at a relatively slow speed either toward its distant or close-up focus positions. If the lens is being driven at a relatively moderate rate of speed (for example, if $e_o(n-1) = PM$ or if $e_o(n-1) = NM$), rules similar to reasoning rules H1-H12 may be inferred. Similarly, if the lens is driven at a relatively high rate of speed toward its distant or close-up focus position (for example, if $e_o(n-1) = PL$ or if $e_o(n-1) = NL$), rules similar to foregoing reasoning rules H1-H12 may be inferred to produce lens drive signal $e_o(n)$ to effect prompt and accurate focusing. In the interest of brevity, such additional reasoning rules are not discussed herein.

Control circuit 70 executes reasoning rules H1-H12, I1-I2 and J1-J2 by the use of membership functions. As was discussed above in conjunction with the embodiment shown in FIG. 3, a set of membership functions may be used to represent a preceding lens drive signal $e_o(n-1)$, a focus change $\Delta b_o$, a lens position $F_o$, a focus condition $b_o$ and the inferred lens drive signal $e_o(n)$. Depending upon the actual values of these variables $e_o(n-1)$, $b_o$, $\Delta b_o$ and $F_o$, the inferred lens drive data $e_o(n)$ exhibits a value that may be satisfied by one or more membership functions; and a suitable lens drive signal is derived from those membership functions.

Figure 10:
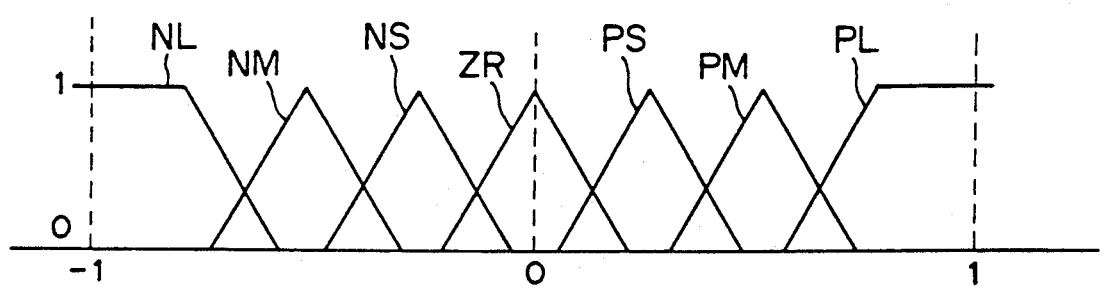
FIGS. 10 and 11 are graphical representations of sets of membership functions which are used in conjunction with fuzzy inference to obtain focusing control in accordance with the embodiment shown in FIG. 9.

Before describing the manner in which inference processing using these membership functions is carried out, reference is made to FIG. 10 which graphically illustrates a set of membership functions that represent the degree to which, for example, the variable $\Delta b_o$ or $F_o$ or $e_o(n-1)$ satisfies predetermined ranges. The membership functions illustrated in FIG. 10 are quite similar to those discussed above in conjunction with FIG. 4 and, in the interest of brevity, further explanation is not provided. It will be noted, however, that the respective triangularly shaped membership functions shown in FIG. 10 all exhibit substantially the same shape, whereas the triangularly shaped membership functions illustrated in FIG. 4 exhibit different widths for different normalized values of the variable. Sets of membership functions of the type shown in FIG. 10 are stored in a memory by providing sampled data for each membership function in a set. It will be appreciated that the storage of the membership functions shown in FIG. 10 is quite similar to the previously described storage of the membership functions shown in FIG. 4. Here, however, the representation of a membership function by a sample that is shifted by one-half of a sampling pitch from a sample used to represent an adjacent membership function is optional.

If the set of membership functions shown in FIG. 10 is representative of lens position $F_o$, the normalized value $-1$ represents the position of the lens at its close-up focus position and the normalized value $+1$ represents the position of the lens at its distant focus condition. The seven membership functions NL-PL represent different focus positions of the lens between close-up and distant.

Likewise, if the set of membership functions illustrated in FIG. 10 represents the lens drive data $e_o$, the normalized value $-1$ represents the lens drive data for driving lens 62 at high speed toward its close-up focus position; and the normalized value $+1$ represents the lens drive data for driving the lens at high speed toward its distant focus position.

If the set of membership functions illustrated in FIG. 10 represents the focus change $\Delta b_o$, the normalized value $-1$ represents a large change toward the out-of-focus condition of lens 62; and the normalized value $+1$ represents a large change toward the in-focus condition of the lens.

Figure 11:
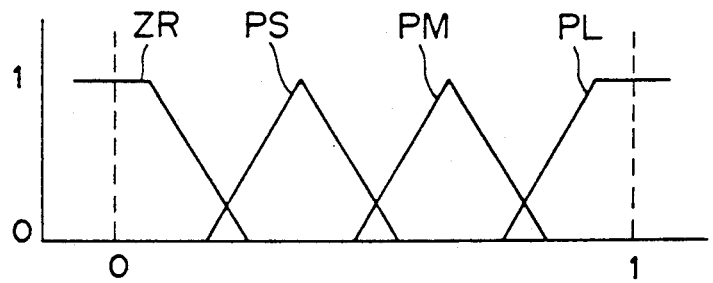

Focus signal $b_o$ is represented by the set of membership functions illustrated in FIG. 11. It is appreciated that, although the focus change $\Delta b_o$ may be of negative polarity, the focus signal itself exhibits only positive values. Accordingly, the normalized value 0 represents a maximum unfocused condition of lens 62 and the normalized value $+1$ represents the in-focus condition of the lens. Four membership functions ZR-PL represent predetermined ranges of the focus signal, extending from a substantially zero focus signal ZR to a relatively large focus signal PL.

Figure 12:
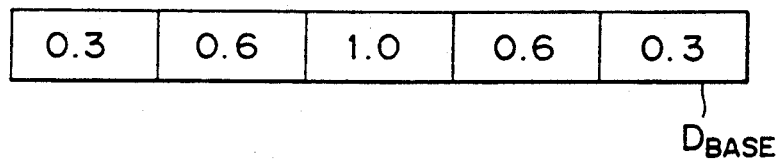
FIG. 12 represents identifying data used to represent a membership function shown in, for example, FIG. 10.

Preferably, to represent a set of membership functions of the type shown in FIGS. 10 and 11, the abscissa extending from $-1$ to $+1$ or, in the case of FIG. 11, from 0 to $+1$, is divided into thirty-two samples. Each membership function in a set thus may be stored as a subset of these thirty-two samples. Excluding the extreme membership functions NL and PL in FIG. 10 and excluding the extreme membership functions ZR and PL in FIG. 11, each of the triangularly shaped membership functions exhibits substantially the same shape. Each triangular characteristic may be represented with relatively low resolution formed of, for example, five samples. FIG. 12 illustrates these five samples representing an illustrative triangular characteristic and is referred to as membership function data $D_{BASE}$. This membership function data represents the characteristic relationship (shown as triangular in FIGS. 10 and 11) between the variable (such as $F_o$, $b_o$ and $\Delta b_o$) and its degree of satisfaction in the particular range (such as the range PM, PS, ZR, NS or NM). The remaining twenty-seven samples for each membership function are essentially zero. It is recognized that such zero-value samples are redundant and, if stored, unnecessarily occupy useful space in the memory used to store the samples representing the set of membership functions shown in FIG. 10 or FIG. 11.

Figures 13, 14:
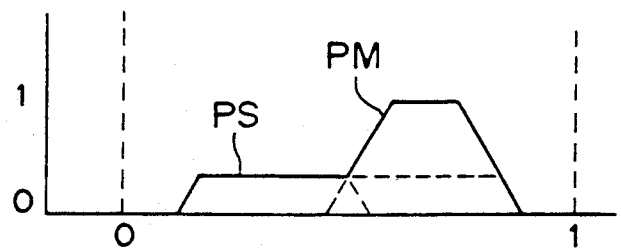
FIG. 13 represents position data for locating the respective membership functions illustrated in, for example, FIG. 10.
FIG. 14 is a graphical representation of the fuzzy inference obtained in accordance with an example of the operation of the embodiment shown in FIG. 9.

Since the membership function data $D_{BASE}$ shown in FIG. 12 is substantially the same for each triangularly shaped membership function in each set, this membership function data may be stored as common data $D_{BASE}$ and used to represent each memory function. Thus, rather than storing five duplicate membership function data for the set of membership functions representing the variable $F_o$ and five duplicate membership function data for the set of membership functions representing the variable $e_o$ and five duplicate membership function data for the set of membership functions representing the variable $\Delta b_o$ and two duplicate membership function data for the set of membership functions representing the variable $b_o$, only one $D_{BASE}$ need be stored. In addition, position data, referred to as $D_{SUB}$, may be stored to represent the beginning location of each membership function along the abscissa. Thus, and as shown in FIG. 13, for position data $F_o$ the membership function PM begins at sample 21 along the abscissa, membership function PS begins at sample 17, membership function ZR begins at sample 13, membership function NS begins at sample 9 and membership function NM begins at sample 5. Consequently, rather than representing each membership function with thirty-two samples, only six samples need be used: five samples representing the membership function data $D_{BASE}$ shown in FIG. 12 and one sample representing the position data $D_{SUB}$ which identifies the coordinate along the abscissa at which the membership function begins.

Since membership functions PM, PS, ZR, NS and NM in each set exhibit substantially the same characteristic relationship, common membership function data $D_{BASE}$ is used to represent all of the membership functions, and each membership function additionally is represented by a unique position data $D_{SUB}$. Furthermore, if a particular membership function in one set is located at the same position along the abscissa as that membership function is located in another set, the data which represents a particular set may be used in common by all sets. FIG. 13 illustrates a table that represents common position data $D_{SUB}$ used for lens position data $F_o$, focus data $b_o$, lens drive data $e_o$ and focus change $\Delta b_o$. Optimally, one set of samples representing the triangular characteristic of a membership function and five samples representing the position for each triangular membership function may be used in common for lens position data $F_o$, focus change $\Delta b_o$ and lens drive data $e_o$. Only two samples need be used to represent the position of the triangular characteristics of the membership functions for focus data $b_o$.

In accordance with the foregoing, a memory of relatively small capacity may be utilized effectively to store a table which represents the respective sets of membership functions.

Control circuit 70 is adapted to infer lens drive data by using the "Mamdani" technique, discussed above in conjunction with the embodiment shown in FIG. 3. Accordingly, the control circuit normalizes the focus signal $b_o$, the focus change $\Delta b_o$, the lens position signal $F_o$ and the preceding lens drive signal $e_o(n-1)$. These normalized variables are used to read from the memory those membership functions included in sets $e_o(n-1)$, $\Delta b_o$, $b_o$ and $F_o$ which are satisfied by these normalized variables. Then, the selected membership functions which are read from the memory are further processed in accordance with the aforementioned reasoning rules H1-H12, I1-I2 and J1-J2 to infer a lens drive signal $e_o$.

The manner in which membership functions are read from the memory and then processed is quite similar to that discussed hereinabove in conjunction with the operation of the embodiment shown in FIG. 3. In the interest of brevity, description of this operation will not be repeated. Nevertheless, it is appreciated that a membership function for lens drive data $e_o$ is inferred from the membership functions for variables $e_o(n-1)$, $\Delta b_o$, $b_o$ and $F_o$ in accordance with the foregoing reasoning rules. The maximum value of the inferred membership function for the lens drive data $e_o$ is limited to the smaller of the value of the membership function corresponding to the normalized variable $e_o(n-1)$ or $\Delta b_o$ when reasoning rules H1-H12 are used, or to the smaller of the value of the membership function corresponding to the normalized variable $e_o(n-1)$ or $\Delta b_o$ when reasoning rules I1 and I2 are used, or to the smaller of the value of the membership function corresponding to the normalized variable $b_o$ or $F_o$ when reasoning rules J1-J2 are used.

As before, it is expected that, depending upon the variables which are used by the reasoning rules to infer the lens drive data $e_o$, two membership functions for the lens drive will be inferred. Both membership functions are limited, or truncated, as aforesaid, that is, each inferred membership function for the lens drive data is limited to the smaller of the value corresponding to the normalized variable of the membership functions which are used by the reasoning rules.

FIG. 14 illustrates two truncated membership functions PS and PM which contain the lens drive data $e_o$ inferred by, for example, reasoning rules H2 and H3. The illustrated membership functions which are satisfied by the lens drive data $e_o$ are subjected to an OR operation, resulting in a membership function characteristic represented by the solid line in FIG. 14. A lens drive signal $e_o$ is derived from the membership function characteristic shown in FIG. 14 by determining the center of gravity of that characteristic. The manner in which the center of gravity is determined is substantially the same as that which has been discussed hereinabove in conjunction with the embodiment shown in FIG. 3 and described in particular with respect to the flow chart of FIG. 7 and graphical representation of FIG. 8. In the interest of brevity, further description as to the specific manner in which the center of gravity is determined for the membership function characteristic shown in FIG. 14 is not provided.

To summarize the manner in which the present invention provides fuzzy focus control of lens 62, the actual position of the lens is supplied to control circuit 70 by a suitable transducer as position signal $F_o$. This position signal represents the actual position of the lens within the range from its close-up position to its distant position. In addition, the control circuit receives focus signal $b_o$ whose magnitude is at a maximum when lens 62 is at an in-focus position with respect to an object imaged to, for example, the central portion of the pickup screen included in pickup element 64. The magnitude of focus signal $b_o$ is reduced if the lens is not in focus with respect to that object. Control circuit 70 functions to detect changes $\Delta b_o$ in the focus signal $b_o$; and positive changes indicate that lens 62 is being driven toward its in-focus position, whereas negative changes indicate that the lens is being driven further in the out-of-focus direction.

The control circuit functions at timed intervals to produce lens drive signal $e_o$. The presently produced lens drive signal $e_o(n)$ determines the direction and speed with which motor 72 moves lens 62. Control circuit 70 relies upon the lens drive signal $e_o(n-1)$ produced at a preceding timed interval (which represents the positioning of the lens) to produce the present lens drive signal $e_o(n)$ in accordance with reasoning rules H1-H12, I1-I2 and J1-J2. The processor included in the control circuit is programmed to utilize these reasoning rules to infer, by fuzzy inference, lens drive data $e_o$ which exhibit a membership function characteristic of the type shown in FIG. 14. The center of gravity of this resulting lens drive data is determined by the routine shown in FIG. 7, resulting in a lens drive signal $e_o(n)$ that is supplied to lens drive motor 72.

Thus, even though a computer model of an automatic focusing arrangement is not easily constructed, the present invention permits a relatively simple yet accurate implementation of automatic focus control. Furthermore, whereas the prior art was susceptible to instability due to inadvertent movement or jiggling of the camera, movement of the object being focused, and the like, the present invention avoids these disadvantages by relying on fuzzy inference. Thus, focus control errors which were inherent in prior art implementations are avoided by the instant invention.

Various alternatives are contemplated to the embodiment shown in FIG. 9. For example, although high frequency components in the pickup signal $S_s$ preferably are used to indicate the focus condition of lens 62, several band pass filters may be used to detect varying frequency bands in the pickup signal to indicate the focus condition of the lens. Additionally, although control circuit 70 has been described as processing lens position signal $F_o$, focus signal $b_o$, focus change $\Delta b_o$ and the preceding lens drive signal $e_o(n-1)$, other signals associated with the focus condition of the lens may be used, such as an indication of depth of field.

Figure 15:
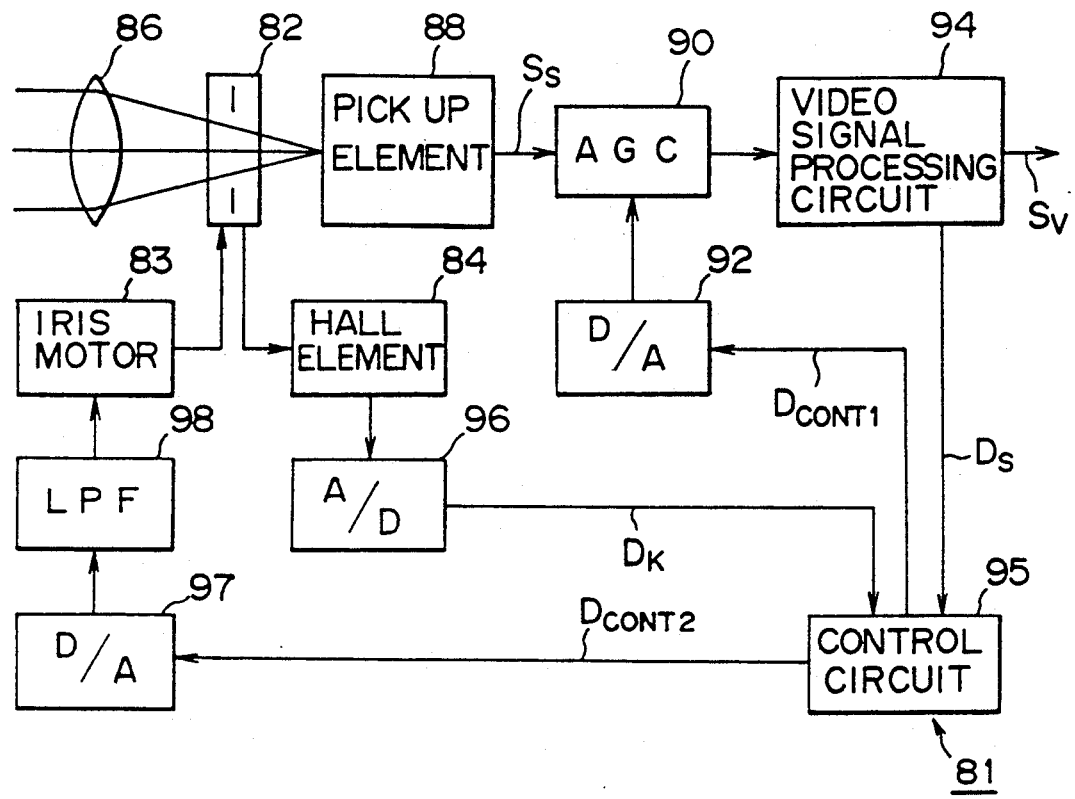
FIG. 15 is a block diagram of yet another embodiment of a television camera diaphragm control arrangement in which the present invention finds ready application.

Another embodiment of a television camera or still video camera having an adjustable imaging member controllable in accordance with the present invention is illustrated by the block diagram of FIG. 15. In this embodiment, camera 81 is provided with a diaphragm controller which functions to adjust automatically the aperture opening of a diaphragm 82 as a function of the brightness of the object being imaged. The diaphragm controller serves to provide a pickup signal $S_s$ of proper amplitude and, thus, the aperture opening of the diaphragm is adjusted in cooperation with the gain applied to the pickup signal.

Diaphragm 82 is driven by iris motor 83 (which may be similar to the iris motor described in conjunction with FIG. 3) to pass light focused by a lens 86 onto a pickup screen included in a pickup element 34. As will be described below in conjunction with FIG. 16, the pickup screen included in the pickup element is provided with a matrix array of subareas, or subscreens, the average brightness of each being detectable.

Pickup element 88 is adapted to generate a pickup signal $S_s$ which is supplied to a video signal processing circuit 94 by a automatic gain controlled (AGC) circuit 90. The video signal processing circuit is conventional and derives a video signal $S_V$ from the pickup signal $S_S$. In addition, brightness data $D_S$ is produced by the video signal processing circuit to provide an indication of the average brightness of each subscreen included in the pickup screen of pickup element 88. This brightness data $D_S$ is supplied to control circuit 95 which, preferably, includes a microprocessor programmed to carry out a fuzzy inference operation, as will be described below.

The position of diaphragm 82, that is, the aperture opening thereof, is sensed by a Hall element 84 (which may be similar to Hall element 3 described above in conjunction with FIG. 3), which produces a positioning signal representing the position, or aperture opening, of the diaphragm. The positioning signal produced by the Hall element is converted to digital form $D_k$ by an A/D converter 96 and is supplied to control circuit 95.

As a result of the fuzzy inference operation of the control circuit, aperture control data $D_{CONT2}$ and gain control data $D_{CONT1}$ are produced. The gain control data $D_{CONT1}$ is converted to analog form by D/A converter 92 and supplied as a gain control signal to AGC circuit 90. Thus, the level of the pickup signal is adjusted as a function of the gain determined by gain control data $D_{CONT1}$.

The aperture control data $D_{CONT2}$ is converted to analog form by D/A converter 97 and supplied as a motor drive signal to iris motor 83 by a low pass filter 98.

Although not shown in FIG. 15, it will be appreciated that, if desired, automatic control over diaphragm 82 may be supplemented by manual setting, such as that described above in conjunction with FIG. 3.

As will be described, the fuzzy inference operation carried by control circuit 95 permits precise control over diaphragm 82 even though, as mentioned above, a simple computer model of the diaphragm and diaphragm control circuitry may not be constructed easily. Fuzzy inference provides accurate control even if the camera is used in different environments, such as on snow, at the seashore, and the like.

Control circuit 95 preferably includes a commercially available microprocessor and, additionally, fuzzy logic circuits of the type described above. The microprocessor is programmed to carry out specific reasoning rules and fuzzy logic implementations, such as mentioned in U.S. Pat. Nos. 4,760,896 and 4,864,490.

Figure 16:
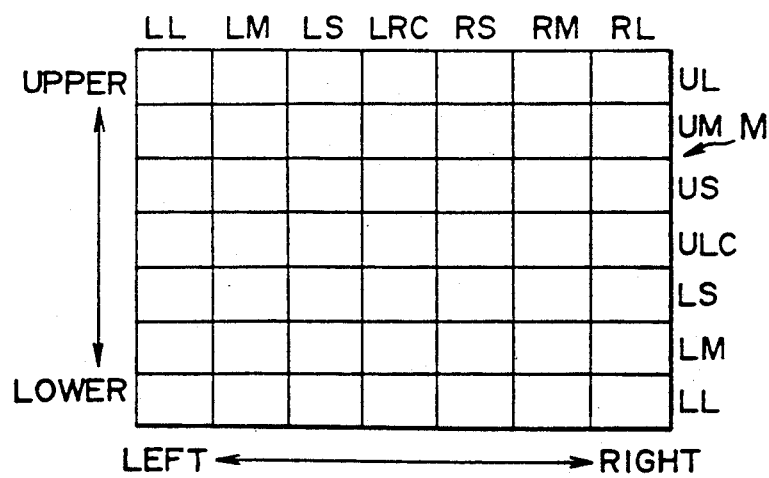
FIG. 16 is a schematic representation of an image pickup screen used by the embodiment shown in FIG. 15.

The purpose of control circuit 95 is to generate aperture correction data $D_{CONT2}$ for opening and closing the aperture of diaphragm 82 and to generate gain control data $D_{CONT1}$ for increasing and decreasing the gain of AGC circuit 90 in response to the brightness data $D_S$ and diaphragm position data $D_K$ supplied thereto. The brightness data $D_S$ is derived from the subscreens of the pickup screen included in pickup element 88, as aforementioned. FIG. 16 is a schematic representation of the pickup screen comprised of a matrix array of subscreens. For convenience, each row of subscreens may be designated as follows:
UL = Uppermost Row
UM = Intermediate Upper Row
US = Slightly Upper Row
ULC = Middle Row
LS = Slightly Lower Row
LM = Lower intermediate Row
LL = Lowermost Row The matrix array of subscreens also is formed of the following columns:
LL = Leftmost Column
LM = Left Intermediate Column
LS = Slightly Left Column
LRC = Middle Column
RS = Slightly Right Column
RM = Right Intermediate Column
RL = Rightmost Column With the foregoing designations, control circuit 95 operates in accordance with the following reasoning rules:

Rule K1:
If the entire pickup screen is bright, diaphragm 82 is closed ($D_{CONT2}$ is negative).

Rule K2:
If the entire pickup screen is dark, diaphragm 82 is opened ($D_{CONT2}$ is positive).

Rule K3:
If the entire pickup screen is dark even after the diaphragm is fully opened, the gain of AGC circuit 90 is increased ($D_{CONT1}$ is positive).

Rule K4:
If the center portion of the pickup screen is dark but the peripheral portion of that screen is light, the diaphragm is opened by a small amount.

Rule K5:
If the center portion of the pickup screen is bright but the peripheral portion is quite dark, the diaphragm is closed by a small amount.

Rule X6:
If the upper and lower portions of the pickup screen are very bright, the diaphragm is opened a small amount.

Rule K7:
If the upper portion of the pickup screen is very bright, the diaphragm is closed a small amount.

It is appreciated that the foregoing reasoning rules K1-K7 may be expressed in a manner similar to the expression of, for example, reasoning rules R1-R9, wherein the degree of brightness may be expressed in terms of PL, PM, PS, ZR, NS, NM and NL; and various portions of the pickup screen may be represented by column and row coordinates which identify each such subscreen. For example, each subscreen may be represented by a column and row identification, wherein the respective subscreens included in the upper row may be identified as LL-UL, LM-UL, LS-UL, . . . RL-UL. Similarly, the subscreens included in the next adjacent row may be expessed as LL-UM, LM-UM, . . . RL-UM. Similar expressions may be used to identify the remaining subscreens included in the pickup screen. It is appreciated that brightness data $D_S$ represents the average brightness of each such subscreen. Thus, control circuit 95 is provided with brightness data to identify the average brightness level of each subscreen included in the pickup screen. Based upon these values, the control circuit infers, by fuzzy inference, the gain control data $D_{CONT1}$ and the aperture control data $D_{CONT2}$. The aperture control data $D_{CONT2}$ may be expressed as membership functions as follows:
PM = Open the diaphragm by a moderate amount.
NM = Close the diaphragm by a moderate amount.
PS = Open the diaphragm by a small amount.
NS = Close the diaphragm by a small amount.

Control circuit 95 executes reasoning rules K1-K7 by the use of membership functions. Brightness data $D_S$, position data $D_K$, gain control data $D_{CONT1}$ and aperture control data $D_{CONT2}$ each may be represented by a set of membership functions. Depending upon the actual value of the brightness of the respective subscreens shown in FIG. 16 and the actual aperture opening represented by position data $D_K$, the inferred gain control data as well as the inferred aperture control data exhibit values that may be satisfied by one or more membership functions; and suitable gain control and aperture control signals are derived from those membership functions.

Figure 17:
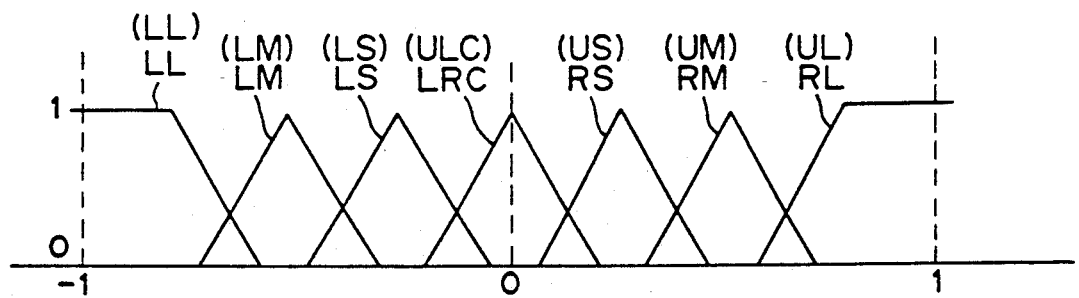
FIGS. 17–19 are graphical representations of sets of membership functions which are used in conjunction with fuzzy inference to obtain diaphragm control in accordance with the embodiment shown in FIG. 15.

Before describing the manner in which inference processing using these membership functions is carried out, reference is made to FIG. 17 which graphically illustrates two substantially identical sets of membership functions that represent, respectively, the degree to which a subscreen satisfies predetermined ranges of subscreens ranging from the lowermost row of subscreens LL to the uppermost row of subscreens UL, and the degree to which a subscreen satisfies predetermined ranges from the leftmost column of subscreens LL to the rightmost column of subscreens RL. A comparison of the graphical representation shown in FIG. 17 to the schematic illustration of the pickup screen shown in FIG. 16 indicates the correspondence between columns of subscreens LL, LM, LS, LRC, RS, RM and RL, observing the subscreens in a left-to-right direction, and the correspondence between rows of subscreens LL, LM, LS, ULC, US, UM and UL observing the subscreens in the bottom-to-top direction. The abscissa shown in FIG. 17 represents a normalized variable, such as the subscreen row or subscreen column. The normalized value 0 corresponds to the middle row ULC and also to the middle column LRC. The normalized value +1 corresponds to the uppermost row UL and to the rightmost column RL. Finally, the normalized value −1 corresponds to the lowermost row LL and to the leftmost column LL.

Figure 18:
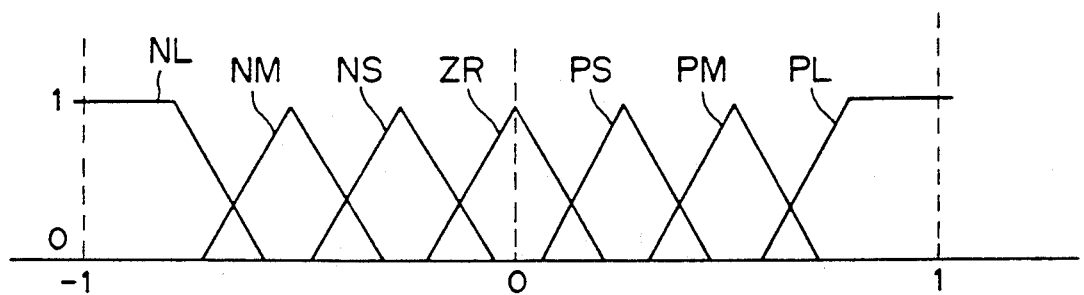

The membership functions illustrated in FIG. 18 represent the degree to which gain control data and aperture control data satisfy predetermined ranges of control. The normalized value 0 represents substantially zero control data, the normalized value +1 represents large control data which substantially increases the gain of AGC circuit 90 and substantially opens the aperture of diaphragm 82, and the normalized value −1 represents large control data which substantially reduces the gain of the AGC circuit and substantially closes the aperture of the diaphragm. The set of membership functions illustrated in FIG. 18 ranges from a large negative value NL to a large positive value PL.

Figure 19:
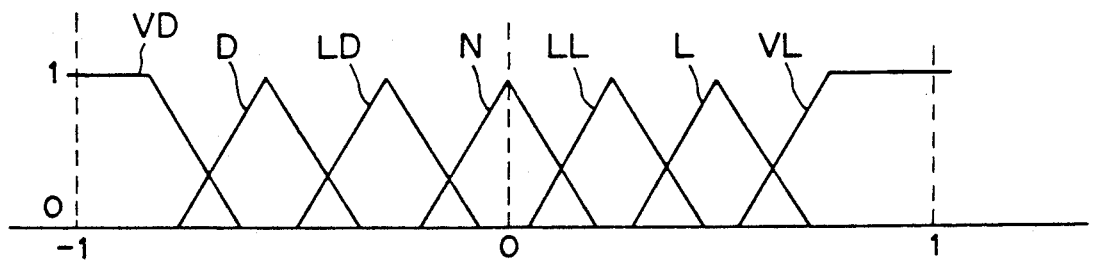

Similarly, the expected values of brightness of the subscreens in pickup element 88 are represented as the set of membership functions shown graphically in FIG. 19. This set is comprised of membership functions VD, D, LD, N, LL, L and VL which represent the following brightness levels:
VD = Very Dark
D = Dark
LD = Moderately Dark
N = Neutral
LL = Moderately Light
L = Light
VL = Very Light
As in the case of FIGS. 17 and 18, the abscissa of FIG. 19 represents a normalized variable (i. e. the normalized brightness level) ranging from a very dark level of −1 to a very light level of +1.

The ordinates shown in the graphical illustrations of FIGS. 17, 18 and 19 each represents the degree to which the normalized variable satisfies the indicated range. In FIG. 17, the normalized variable is the row and column of the subscreen; in FIG. 18 the normalized variable is the gain control data $D_{CONT1}$ and the aperture control data $D_{CONT2}$; and in FIG. 19, the normalized variable is the brightness data $D_S$. As used herein, the "value" of a membership function means the degree to which the variable satisfies a respective range. The set of membership functions corresponding to subscreen row, subscreen column, gain control, aperture control and brightness may be stored in a memory, such as a ROM, by quantizing each membership function such that each quantized sample is stored as a digital representation of the sample value and the abscissa location (or coordinate) of that sample. It will be appreciated that the storage of the membership functions shown in FIGS. 17, 18 and 19 is quite similar to the previously described storage of the membership functions shown in FIGS. 10 and 11. The respective triangularly shaped membership functions shown in FIG. 17 all exhibit substantially the same shape, as do the triangularly shaped membership functions shown in FIG. 18 and the triangularly shaped membership functions shown in FIG. 19.

As was the case with the membership functions shown in FIGS. 10 and 11, it is preferable to represent a set of membership functions of the type shown in FIGS. 17, 18 and 19 by dividing the abscissa in each set into thirty-two samples. Each membership function in a set thus may be stored as a subset of these thirty-two samples. Excluding the extreme membership functions LL, RL, LL, UL, ML, PL and VD, VL, each of the triangularly shaped membership functions exhibits substantially the same shape. Each triangular characteristic may be represented with relatively low resolution formed of, for example, five samples. FIG. 20 illustrates these five samples representing an illustrative triangular characteristic and, as was referred to in FIG. 12, these samples are identified as membership function data $D_{BASE}$. While these five samples express the triangular characteristic relationship between the variable (e. g. the subscreen row, the subscreen column, the gain control, the aperture control or the brightness) and its degree of satisfaction in the particular range (such as those ranges illustrated in FIGS. 17, 18 and 19), the remaining samples for each membership function are essentially zero.

The membership function data $D_{BASE}$ is substantially the same for each membership function in a set (such as the set representing the subscreen row, the set representing the subscreen column, the set representing gain control, the set representing aperture control and the set representing brightness). This membership function data may be stored as common data to represent each membership function. If all of the membership function characteristics in all of the sets are substantially identical, rather than storing twenty-five duplicate membership function data, only one $D_{BASE}$ need be stored. In addition, position data, referred to as $D_{SUB}$, may be stored to represent the beginning location of each membership function along the abscissa. Thus, and as shown in FIG. 21, for subscreen rows the membership function UM begins at sample 21 along the abscissa, membership function US begins at sample 17, membership function ULC begins at sample 13, membership function LS begins at sample 9 and membership function LM begins at sample 5. Consequently, rather than representing each membership function with thirty-two samples, only six samples need be used: five samples representing the membership function data $D_{BASE}$ shown in FIG. 20 and one sample representing the position data $D_{SUB}$ which identifies the coordinate along the abscissa at which the membership function begins.

It is appreciated that the position data $D_{SUB}$ representing the starting location for each of the membership functions included in the set representing the subscreen columns, in the set representing brightness, in the set representing gain control and in the set representing aperture control will be substantially identical to the position data which identifies the starting locations of the membership functions included in the set representing subscreen rows. Optimally, one set of samples representing the triangular characteristic relationship of a membership function and five samples representing the position data for each membership function in a set may be used in common for the subscreen rows, the subscreen columns, the brightness, the gain control and the aperture control. Accordingly, a memory of relatively small capacity may be utilized effectively to store tables which represent the respective sets o membership functions. In the preferred embodiment, only one such table need be stored.

Similar to control circuit 70, control circuit 95 in FIG. 15 is adapted to infer gain and aperture control b using the "Mamdani" technique. Accordingly, the control circuit normalizes the brightness data for each subscreen row and for each subscreen column to read from the memory in which the sets of membership functions are stored those membership functions which are satisfied by these normalized variables. Then, the selected membership functions which are read from the memory are further processed in accordance with specific reasoning rules K1-K7 to infer aperture and gain control data $D_{CONT2}$ and $D_{CONT1}$, respectively. The manner in which membership functions are selected from the memory and then processed has been discussed in detail hereinabove in conjunction with the embodiment shown in FIG. 3 and also in conjunction with the embodiment shown in FIG. 9. Accordingly, in the interest of brevity, and in an effort to avoid unnecessary duplication, further description of the selection and processing of membership function is not provided.

It will be appreciated that, when reasoning rule K1 is invoked, the determination of whether the entire pickup screen is bright is determined by obtaining a simple sum average of the normalized brightness data derived from each of the subscreens. If the normalized, simple sum average falls within membership function L of FIG. 19, reasoning rule K1 is used.

It is recognized that, in accordance with the Mamdani method, the membership function characteristic which is inferred for gain control data $D_{CONT1}$ or aperture control data $D_{CONT2}$ is limited in its maximum value to the lesser of the membership function values corresponding to the normalized variables which are considered by the particular reasoning rule which is invoked. FIG. 22 illustrates the inference of membership function PM, for example, for inferring the aperture control data $D_{CONT2}$, which is truncated, or limited, to a maximum value in accordance with the Mamdani method. FIG. 22 also indicates that, in accordance with the particular values of subscreen brightness, the aperture control data $D_{CONT2}$ also is inferred as being included in membership function PS. Here too, the maximum value of this inferred membership function PS is truncated, or limited, to the smaller of the value of the membership function corresponding to subscreen brightness. These membership functions PS and PM inferred for aperture control data $D_{CONT2}$ are subjected to an OR operation, resulting in the membership function characteristic represented by the solid line in FIG. 22. As was described above in conjunction with FIGS. 6 and 14, an aperture control signal is derived from the membership function characteristic shown in FIG. 22 by determining the center of gravity of that characteristic. The coordinate of that center of gravity along the abscissa represents the normalized aperture control value.

In the interest of brevity, and to avoid unnecessary duplication and redundancy, the manner in which the aperture control signal is produced from the membership function of the aperture control data inferred by the fuzzy inference technique of the present invention will not be described. Nevertheless, it will be appreciated that control circuit 95 operates in the manner discussed hereinabove in conjunction with the embodiments shown in FIGS. 3 and 9 to produce from the membership function characteristic of FIG. 22 the proper aperture control data $D_{CONT2}$ which, in turn, is converted to analog form by D/A converter 97 and supplied through filter 98 to iris motor 83.

In carrying out reasoning rules K1-K7, a measurement of the brightness of a row or column, or of plural rows or columns, is determined by control circuit 95 by the simple sum average of those subscreens included in the row(s) and column(s). For example, the determination of the brightness of rows UL and LL, respectively, is made by obtaining the simple sum average of subscreens LL-UL, LM-UL, LS-UL, LRC-UL, RS-UL, RM-UL and RL-UL, and by obtaining the simple sum average of subscreens LL-LL, LM-LL, LS-LL, LRC-LL, RS-LL, RM-LL and RL-LL. If, as a result of these simple sum averages, it is determined that the uppermost and lowermost rows of the pickup screen are extremely bright, reasoning rule K6 is followed. When using this reasoning rule, aperture control data $D_{CONT2}$ is represented by membership function PS, and the maximum value of this membership function is limited, or truncated, by the lesser of the value corresponding to the simple sum average of the uppermost row of subscreens and the simple sum average of the lowermost row of subscreens.

It will be appreciated that the remaining reasoning rules K1, K2, ... K7 likewise are implemented by obtaining the simple sum average of the brightness of appropriate rows and columns of subscreens To summarize the manner in which the present invention provides fuzzy aperture control of diaphragm 82 and fuzzy gain control of AGC circuit 90, the brightness of each subscreen included in pickup element 88 is supplied to control circuit 95 as brightness data $D_S$. The control circuit obtains average values of rows and columns and of particular areas of the pickup screen as a function of this brightness data. The fuzzy inference circuit included in control circuit 95 utilizes reasoning rules K1-K7 to infer aperture control data $D_{CONT2}$ which exhibits a membership function characteristic of the type shown in FIG. 22. The center of gravity of this resulting aperture control data is determined by the routine discussed above in conjunction with FIG. 7, resulting in an aperture control signal that is supplied to iris motor 83 by D/A converter 97. Consequently, diaphragm 82 is driven smoothly and accurately in a direction such that the signal level of the processed video signal $S_V$ is maintained within proper limits. Likewise, AGC circuit 90 is controlled by gain control data $D_{CONT}$ to increase the gain of the video signal in the event that its level is too low even when diaphragm 82 is fully opened and, conversely, to reduce the gain of the signal when its level is too high even when the aperture opening of the diaphragm is substantially reduced.

Various alternatives are contemplated to the embodiment shown in FIG. 15. For example, the actual opening of diaphragm 33 may be detected by means other than Hall element 84.

While the present invention has been particularly shown and described with reference to preferred embodiments, it will be readily appreciated by those of ordinary skill in the art that various changes and modifications may be made without departing from the spirit and scope of the invention. It is intended that the claims be interpreted to cover the disclosed embodiments, those alternatives which have been discussed above and all equivalents thereto.

What is claimed is:

1. A method of controlling optical characteristics of an imaging device of the type having an adjustable imaging member, said method comprising the steps of: detecting an operating optical condition of said imaging device; generating correction control data as a function of the detected condition by using fuzzy inference to obtain correction control values; and adjusting said imaging member in response to said correction control data.

2. The method of claim 1 wherein said adjustable imaging member is positionable; and said step of detecting the operating optical condition comprises producing positioning data representing positioning of said adjustable imaging member, and producing optic data representing an operating function of said adjustable imaging member.

3. The method of claim 2 wherein said adjustable imaging member comprises a diaphragm having an adjustable aperture; and said positioning data represents aperture position $\theta$ and said optic data represents a change $\Delta\theta$ in said aperture position.

4. The method of claim 3 wherein said aperture position $\theta$ comprises a deviation between a preset aperture and an actual aperture of said diaphragm, and said change $\Delta\theta$ comprises a change in said deviation.

5. The method of claim 4 wherein said step of using fuzzy inference comprises providing a first set of membership functions representing respective degrees to which aperture deviations $\theta$ satisfy predetermined ranges of deviation; providing a second set of membership functions representing respective degrees to which changes $\Delta\theta$ in the deviation satisfy predetermined ranges of change; determining particular membership functions in said first and second sets corresponding to a determined deviation $\theta$ and to a determined change $\Delta\theta$, respectively; and using specific reasoning rules to infer a correction control value from said particular membership functions determined from said first and second sets.

6. The method of claim 5 wherein said step of inferring a correction control value comprises providing a third set of membership functions representing respective degrees to which correction control values satisfy predetermined ranges of values; selecting from the third set at least one membership function in response to the particular membership functions determined from said first and second sets and in accordance with said specific reasoning rules; and deriving the correction control value from the membership function selected from the third set.

7. The method of claim 6 wherein said step of selecting at least one membership function from said third set comprises detecting a value in each membership function of said first set satisfied by said determined deviation $\theta$; detecting a value in each membership function of said second set satisfied by said determined change $\Delta\theta$; and inferring by said specific reasoning rules those membership functions in said third set that are established by the membership functions in said first and second sets having values satisfied by said determined deviation $\theta$ and change $\Delta\theta$, respectively.

8. The method of claim 7 wherein said step of deriving the correction control value comprises limiting a maximum value of a respective membership function selected from said third set with the lesser of the value of the membership functions satisfied by said determined deviation $\theta$ and change $\Delta\theta$, which latter membership functions are used by said specific reasoning rules to infer the membership function selected from said third set.

9. The method of claim 8 wherein said step of deriving the correction control value further comprises the steps of combining all of the limited membership functions selected from said third set; and determining a substantial center of gravity of the combined, limited membership functions to generate said correction control data.

10. The method of claim 2 wherein said adjustable imaging member comprises movable lens means; and said positioning data represents positioning ($e_o(n-1)$) of said lens means and said optic data represents focusing ($\Delta b_o$) of said lens means.

11. The method of claim 10 wherein said positioning ($e_o(n-1)$) of said lens means comprises a preceding lens driving signal, said focusing ($\Delta b_o$) of said lens means comprises a change in focusing condition of said lens means, and said correction control data comprises present lens driving data.

12. The method of claim 11 wherein said step of using fuzzy inference comprises providing a first set of membership functions representing respective degrees to which preceding lens drive signals $e_o(n-1)$ satisfy predetermined signal ranges; providing a second set of membership functions representing respective degrees to which changes $\Delta b_o$ in the focusing condition satisfy predetermined ranges of change; determining particular membership functions in said first and second sets corresponding to a preceding lens drive signal $e_o(n-1)$ and to a change $\Delta b_o$ in the focusing condition, respectively; and using specific reasoning rules to infer present lens driving data from said particular membership functions determined from said first and second sets.

13. The method of claim 12 wherein said step of inferring a correction control value comprises providing a third set of membership functions representing respective degrees to which present lens drive data satisfy predetermined ranges of data; selecting from the third set at least one membership function in response to the particular membership functions determined from said first and second sets and in accordance with said specific reasoning rules; and deriving the present lens drive data from the membership function selected from the third set.

14. The method of claim 13 wherein said step of selecting at least one membership function from said third set comprises detecting a value in each membership function of said first set satisfied by said preceding lens drive signal $e_o(n-1)$; detecting a value in each membership function of said second set satisfied by said change $\Delta b_o$ in the focusing condition; and inferring by said specific reasoning rules those membership functions in said third set that are established by the membership functions in said first and second sets having values satisfied by said preceding lens drive signal $e_o(n-1)$ and said change $\Delta b_o$ in the focusing condition, respectively.

15. The method of claim 14 wherein said step of deriving the present lens drive data comprises limiting a maximum value of a respective membership function selected from said third set with the lesser of the value of the membership functions satisfied by said preceding lens drive signal $e_o(n-1)$ and said change $\Delta b_o$ in the focusing condition, which latter membership functions are used by said specific reasoning rules to infer the membership function selected from said third set.

16. The method of claim 15 wherein said step of deriving the present lens drive data further comprises the steps of combining all of the limited membership functions selected from said third set; and determining a substantial center of gravity of the combined, limited membership functions to generate said present lens drive data.

17. The method of claim 11 wherein said preceding lens drive signal ($e_o(n-1)$) comprises the correction control data generated at a preceding sampling time, and wherein said change ($\Delta b_o$) in the focusing condition is detected by sensing a high frequency component of an image signal derived by an optical pickup element from an object imaged through said lens means.

18. The method of claim 2 wherein said adjustable imaging member comprises a diaphragm for imaging an object onto a pickup screen; and said positioning data represents aperture position ($D_K$) of said diaphragm and said optic data represents brightness ($D_S$) of predetermined areas of said pickup screen.

19. The method of claim 18 wherein said step of using fuzzy inference comprises providing a first set of membership functions representing respective degrees to which brightness $D_S$ of particular areas of said pickup screen satisfy predetermined ranges of brightness; determining particular membership functions in said first set corresponding to a determined brightness $D_S$; and using specific reasoning rules to infer a correction control value from said particular membership functions.

20. The method of claim 19 wherein said step of inferring a correction control value comprises providing a second set of membership functions representing respective degrees to which correction control values satisfy predetermined ranges of values; selecting from the second set at least one membership function in response to the particular membership functions determined from said first set and in accordance with said specific reasoning rules; and deriving the correction control value from the membership function selected from the second set.

21. The method of claim 20 wherein said step of selecting at least one membership function from said second set comprises detecting a value in each membership function of said first set satisfied by said determined brightness $D_S$; and inferring by said specific reasoning rules those membership functions in said second set that are established by the membership functions in said first set having values satisfied by said determined brightness $D_S$.

22. The method of claim 21 wherein said step of deriving the correction control value comprises averaging the values of the membership functions in said first set satisfied by said determined brightness $D_S$; and limiting a maximum value of a respective membership function selected from said second set with said averaged values.

23. The method of claim 22 wherein said step of deriving the correction control value further comprises the steps of combining all of the limited membership functions selected from said second set; and determining a substantial center of gravity of the combined, limited membership functions to generate said correction control data.

24. The method of claim 2 wherein said step of using fuzzy inference comprises providing a first set of membership functions representing respective degrees to which said positioning data satisfies predetermined ranges of data; providing a second set of membership functions representing respective degrees to which said optic data satisfies predetermined ranges of data; determining particular membership functions in said first and second sets corresponding to the positioning and operating function, respectively, of the adjustable imaging member; and using specific reasoning rules to infer a correction control value from the particular membership functions determined from said first and second sets.

25. The method of claim 24 wherein said step of inferring a correction control value comprises providing a third set of membership functions representing respective degrees to which correction control values satisfy predetermined ranges of values; selecting from the third set at least one membership function in response to the particular membership functions determined from said first and second sets and in accordance with said specific reasoning rules; and deriving the correction control value from the membership function selected from the third set.

26. The method of claim 25 wherein said step of selecting at least one membership function from said third set comprises detecting a value in each membership function of said first set satisfied by the positioning of the adjustable imaging member; detecting a value in each membership function of said second set satisfied by the operating function of the adjustable imaging member; and inferring by said specific reasoning rules those membership functions in said third set that are established by the membership functions in said first and second sets having values satisfied by said positioning and operating function, respectively.

27. The method of claim 26 wherein said step of deriving the correction control value comprises limiting a maximum value of a respective membership function selected from said third set with the lesser of the value of the membership functions satisfied by said positioning and operating function of the adjustable imaging member, which latter membership functions are used by said specific reasoning rules to infer the membership function selected from said third set.

28. The method of claim 27 wherein said step of deriving the correction control value further comprises the steps of combining all of the limited membership functions selected from said third set; and determining a substantial center of gravity of the combined, limited membership functions to generate said correction control data.

29. The method of claim 25 wherein at least one of said steps of providing first, second and third sets of membership functions comprises storing membership function data representing plural membership function characteristics spaced along an abscissa, each membership function characteristic being represented by data samples derived at uniform sampling positions, with the sampling positions for some of said membership function characteristics being displaced from the sampling positions for others.

30. The method of claim 29 wherein the sampling positions for a particular membership function characteristic being displaced from the sampling positions for membership function characteristics adjacent thereto.

31. The method of claim 30 wherein the displacement is approximately one-half a sampling interval.

32. Apparatus for controlling optical characteristics of an imaging device of the type having an adjustable imaging member, comprising: detecting means for detecting an operating optical condition of said imaging device; fuzzy control means for generating correction control data as a function of the detected condition by using fuzzy inference to obtain correction control values; and adjustment means for adjusting said imaging member in response to said correction control data.

33. The apparatus of claim 32 wherein said adjustable imaging member is positionable; and said detecting means comprises data generating means for producing positioning data representing positioning of said adjustable imaging member, and for producing optic data representing an operating function of said adjustable imaging member.

34. The apparatus of claim 33 wherein said adjustable imaging member comprises a diaphragm having an adjustable aperture; and wherein said positioning data represents aperture position $\theta$ and said optic data represents a change $\Delta\theta$ in said aperture position.

35. The apparatus of claim 34 wherein said aperture position $\theta$ comprises a deviation between a preset aperture and an actual aperture of said diaphragm, and said change $\Delta\theta$ comprises a change in said deviation.

36. The apparatus of claim 35 wherein said fuzzy control means includes memory means for storing a first set of membership functions representing respective degrees to which aperture deviations $\theta$ satisfy predetermined ranges of deviation, and for storing a second set of membership functions representing respective degrees to which changes $\Delta\theta$ in the deviation satisfy predetermined ranges of change, readout means for reading from said memory means particular membership functions in said first and second sets corresponding to a determined deviation $\theta$ and to a determined change $\Delta\theta$, respectively, and processor means programmed to use specific reasoning rules to infer a correction control value from said particular membership functions read from said first and second sets.

37. The apparatus of claim 36 wherein said memory means additionally stores a third set of membership functions representing respective degrees to which correction control values satisfy predetermined ranges of values; and said processor means is further programmed to read from said memory means at least one membership function from the third set in response to the particular membership functions read from said first and second sets and in accordance with said specific reasoning rules, and to derive the correction control value from the membership function read from the third set.

38. The apparatus of claim 37 wherein said processor means is programmed to read at least one membership function from said third set by detecting a value in each membership function of said first set satisfied by said determined deviation $\theta$, detecting a value in each membership function of said second set satisfied by said determined change $\Delta\theta$, and inferring by said specific reasoning rules those membership functions in ssid third set that are established by the membership functions in said first and second sets having values satisfied by said determined deviation $\theta$ and change $\Delta\theta$, respectively.

39. The apparatus of claim 38 wherein said processor means is programmed to derive the correction control value by limiting a maximum value of a respective membership function read from said third set with the lesser of the value of the membership functions satisfied by said determined deviation $\theta$ and change $\Delta\theta$, which latter membership functions are used by said processor means in accordance with said specific reasoning rules to infer the membership function from said third set.

40. The apparatus of claim 39 wherein said processor means is further programmed to derive the correction control value by combining all of the limited membership functions read from said third set, determining a substantial center of gravity of the combined, limited membership functions, and generating said correction control data therefrom.

41. The apparatus of claim 33 wherein said adjustable imaging member comprises movable lens means; and wherein said positioning data represents positioning ($e_o(n-1)$) of said lens means and said optic data represents focusing ($\Delta b_o$) of said lens means.

42. The apparatus of claim 41 wherein said positioning ($e_o(n-1)$) of said lens means comprises a preceding lens drive signal, said focusing ($\Delta b_o$) of said lens means comprises a change in focusing condition of said lens means, and said correction control data comprises present lens driving data.

43. The apparatus of claim 42 wherein said fuzzy control means includes memory means for storing a first set of membership functions representing respective degrees to which preceding lens drive signals $e_o(n-1)$ satisfy predetermined signal ranges, and for storing a second set of membership functions representing respective degrees to which changes $\Delta b_o$ in the focusing condition satisfy predetermined ranges of change, readout means for reading out from said memory means particular membership functions in said first and second sets corresponding to a preceding lens drive signal $e_o(n-1)$ and to a change $\Delta b_o$ in the focusing condition, respectively, and processor means programmed to use specific reasoning rules to infer present lens driving data from said particular membership functions read from said first and second sets.

44. The apparatus of claim 43 wherein said memory means additionally stores a third set of membership functions representing respective degrees to which present lens drive data satisfy predetermined ranges of data; and said processor means is further programmed to read from said memory means at least one membership function from the third set in response to the particular membership functions read from said first and second sets and in accordance with said specific reasoning rules, and to derive the present lens drive data from the membership function read from the third set.

45. The apparatus of claim 44 wherein said processor means is programmed to read at least one membership function from said third set by detecting a value in each membership function of said first set satisfied by said preceding lens drive signal $e_o(n-1)$; detecting a value in each membership function of said second set satisfied by said change $\Delta b_o$ in the focusing condition; and inferring by said specific reasoning rules those membership functions in said third set that are established by the membership functions in said first and second set having values satisfied by said preceding lens drive signal $e_o(n-1)$ and said change $\Delta b_o$ in the focusing condition, respectively.

46. The apparatus of claim 45 wherein said processor means is programmed to derive the present lens drive data by limiting a maximum value of a respective membership function read from s id third set with the lesser of the value of the membership functions satisfied by said preceding lens drive signal $e_o(n-1)$ and said change $\Delta b_o$ in the focusing condition, which latter membership functions are used by said processor means in accordance with said specific reasoning rules to infer the membership function from said third set.

47. The apparatus of claim 46 wherein said processor means is further programmed to derive the present lens drive data by combining all of the limited membership functions read from said third set, determining a substantial center of gravity of the combined, limited membership functions, and generating said present lens drive data therefrom.

48. The apparatus of claim 42 wherein said preceding lens drive signal ($e_o(n-1)$) comprises the lens drive data generated at a preceding sampling time, and further comprising sensing means for sensing a high frequency component of an image signal derived from an object imaged through said lens means, and means for detecting a change $\Delta b_o$ in said high frequency component from one sampling time to another.

49. The apparatus of claim 33 wherein said adjustable imaging member comprises a diaphragm for imaging an object onto a pickup screen having image areas; and wherein said positioning data represents aperture position ($D_K$) of said diaphragm and said optic data represents brightness ($D_S$) of predetermined areas of said pickup screen.

50. The apparatus of claim 49 wherein said fuzzy control means includes a memory means for storing a first set of membership functions representing respective degrees to which brightness $D_S$ of particular areas of said pickup screen satisfy predetermined ranges of brightness; readout means for reading out from said memory means particular membership functions in said first set corresponding to a determined brightness $D_S$, and processor means programmed to use specific reasoning rules to infer a correction control value from said particular membership functions.

51. The apparatus of claim 50 wherein said memory means additionally stores a second set of membership functions representing respective degrees to which correction control values satisfy predetermined ranges of values; and said processor means is further programmed to read from said memory means at least one membership function from the second set in response to the particular membership functions read from said first set and in accordance with said specific reasoning rules, and to derive the correction control value from the membership function read from the second set.

52. The apparatus of claim 51 wherein said processor means is programmed to read at least one membership function from said second set by detecting a value in each membership function of said first set satisfied by said determined brightness $D_S$, and inferring by said specific reasoning rules those membership functions in said second set that are established by the membership functions in said first set having values satisfied by said determined brightness $D_S$.

53. The apparatus of claim 52 wherein said processor means is programmed to derive the correction control value by averaging the values of the membership functions in said first set satisfied by said determined brightness $D_S$, and limiting a maximum value of a respective membership function read from said second set with said averaged values.

54. The apparatus of claim 53 wherein said processor means is further programmed to derive the correction control value by combining all of the limited membership functions read from said second set, determining a substantial center of gravity of the combined, limited membership functions, and generating said correction control data therefrom.

55. The apparatus of claim 33 wherein said fuzzy control means includes memory means for storing a first set of membership functions representing respective degrees to which said positioning data satisfies predetermined ranges of data, and for storing a second set of membership functions representing respective degrees to which said optic data satisfies predetermined ranges of data, readout means for reading out from said memory means particular membership functions in said first and second sets corresponding to the positioning and operating function, respectively, of the adjustable imaging member, and processor means programmed to use specific reasoning rules to infer a correction control value from the particular membership functions read from said first and second sets.

56. The apparatus of claim 55 wherein said memory means additionally stores a third set of membership functions representing respective degrees to which correction control values satisfy predetermined ranges of values; and said processor means is further programmed to read from said memory means at least one membership function from the third set in response to the particular membership functions read from said first and second sets and in accordance with said specific reasoning rules, and to derive the correction control value from the membership function read from the third set.

57. The apparatus of claim 56 wherein said processor means is programmed to read at least one membership function from said third set by detecting a value in each membership function of said first set satisfied by the positioning of the adjustable imaging member, detecting a value in each membership function of said second set satisfied by the operating function of the adjustable imaging member, and inferring by said specific reasoning rules those membership functions in said third set that are established by the membership functions in said first and second sets having values satisfied by said positioning and operating function, respectively.

58. The apparatus of claim 57 wherein said processor means is programmed to derive the correction control value by limiting a maximum value of a respective membership function read from said third set with the lesser of the value of the membership functions satisfied by said positioning and operating function of the adjustable imaging member, which latter membership functions are used by said processor means in accordance with said specific reasoning rules to infer the membership function from said third set.

59. The apparatus of claim 58 wherein said processor means is further programmed to derive the correction control value by combining all of the limited membership functions read from said third set, and determining a substantial center of gravity of the combined, limited membership functions and generating said correction control data therefrom.

60. The apparatus of claim 56 wherein said memory means stores samples derived at uniform sampling positions along an abscissa to represent respective membership function characteristics, with the sampling positions for some of said membership function characteristics being displaced from the sampling positions for others.

61. The apparatus of claim 60 wherein the sampling positions for a particular stored membership function characteristic are displaced from the sampling positions for stored membership function characteristics adjacent thereto.

62. The apparatus of claim 61 wherein the displacement is approximately one-half a sampling interval.

* * * * *